(12) United States Patent
Mine et al.

(10) Patent No.: US 8,774,705 B2
(45) Date of Patent: Jul. 8, 2014

(54) LEARNING SUPPORT SYSTEM AND LEARNING SUPPORT METHOD

(75) Inventors: Ryuji Mine, Kokubunji (JP); Takeshi Nagasaki, Tokyo (JP); Masakazu Fujio, Fuchu (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 14 days.

(21) Appl. No.: 13/523,324

(22) Filed: Jun. 14, 2012

(65) Prior Publication Data
US 2013/0052630 A1 Feb. 28, 2013

(30) Foreign Application Priority Data
Aug. 22, 2011 (JP) ................. 2011-180253

(51) Int. Cl.
*G09B 9/00* (2006.01)
*G06F 17/30* (2006.01)
(52) U.S. Cl.
USPC ........................................................ 434/353
(58) Field of Classification Search
CPC ................................. G09B 9/00; G06F 17/30
USPC ........................................................ 434/353
See application file for complete search history.

(56) References Cited

U.S. PATENT DOCUMENTS

| | | | | |
|---|---|---|---|---|
| 5,779,486 A | * | 7/1998 | Ho et al. | 434/353 |
| 5,797,753 A | * | 8/1998 | Griswold et al. | 434/322 |
| 8,250,071 B1 | * | 8/2012 | Killalea et al. | 707/728 |
| 2002/0042041 A1 | * | 4/2002 | Owens et al. | 434/322 |
| 2010/0068687 A1 | * | 3/2010 | Bertelsen | 434/322 |

FOREIGN PATENT DOCUMENTS

| | | |
|---|---|---|
| JP | 2002-108199 | 4/2002 |
| JP | 2003-66828 | 3/2003 |
| JP | 2003-156996 | 5/2003 |
| JP | 2006-309084 | 11/2006 |
| JP | 2007-271886 | 10/2007 |

OTHER PUBLICATIONS

Takenobu Tokunaga, Information Query and Language Processing, First Version Printed on Nov. 25, 1999, vol. 5.

* cited by examiner

*Primary Examiner* — Sam Yao
*Assistant Examiner* — Robert P Bullington
(74) *Attorney, Agent, or Firm* — Antonelli, Terry, Stout & Kraus, LLP.

(57) ABSTRACT

In order to provide questions suited to skill levels of a learner, it is provided a learning support system which consists of a computer including a processor and a memory, comprising: a question database; a question generator; an answer acquisition module; a scoring module and an achievement degree estimator. The achievement degree estimator compares a number of types of perturbation within the questions to which a correct answer has been given with a predetermined second threshold value. The question generator generates a word changed in accordance with the perturbation of a different type in a case where the number of types of perturbation within the questions to which the correct answer has been given is smaller than the predetermined second threshold value, and sets a question relating to the generated word as a candidate for the question.

14 Claims, 21 Drawing Sheets

WORD DIFFICULTY TABLE

SYNONYM TABLE

ANTONYM TABLE (501)

| WORD ID (502) | WORD (503) | PART OF SPEECH (504) | ANTONYM COUNT (505) | ANTONYM (506) |
|---|---|---|---|---|
| 1 | nice | ADJECTIVE | 4 | nasty, awful, dirty, hateful |
| 2 | greedy | ADJECTIVE | 3 | unacquisitive, undesirous, abstemious |
| 3 | exclusively | ADVERB | 1 | comprehensively |
| ... | ... | ... | ... | ... |

Fig. 6

MODIFICATION RULES TABLE (601)

| RULE ID (602) | RULE (603) |
|---|---|
| 1 | <verb> ⇔ <verb>ed |
| 2 | <verb> ⇔ <verb>s |
| 3 | <Noun> ⇔ <Noun>s |
| ... | ... |

Fig. 7

| QUESTION ID 702 | EDUCATIONAL MATERIAL ID 703 | ORIGINAL QUESTION ID 704 | PERTURBATION GROUP ID 705 | PERTURBATION ID 706 | PERTURBED WORD 707 | VOICE START TIMESTAMP 708 | VOICE END TIMESTAMP 709 | CO-OCCURRENCE WORD 710 |
|---|---|---|---|---|---|---|---|---|
| 1 | 12 | | | | conference | | | |
| 2 | 8 | | | | International | | | |
| 3 | 56 | | | | deleted | | | |
| ... | ... | | | | | | | |

QUESTION DB

| RULE NUMBER | RULE |
|---|---|
| 1 | LIAISON DOES NOT OCCUR AFTER CHARACTER STRING THAT ENDS WITH (.), (,), ('), ("), (!), OR (?). |
| 2 | IF ('s), ('ll), ('d), ('ve), ('t), ('re), OR ('m) IS INCLUDED, LIAISON OCCURS. |
| 3 | LIAISON DOES NOT OCCUR AFTER NUMERAL. |
| 4 | IF THE PREVIOUS WORD ENDS WITH CONSONANT AND IF WORD CONCERNED STARTS WITH VOWEL, LIAISON OCCURS (THE CONSONANT IS PRONOUNCED IN COMBINATION WITH THE VOWEL). |
| 5 | IF THE PREVIOUS WORD ENDS WITH CONSONANT+(e), LIAISON OCCURS ((e) IS NOT PRONOUNCED). |
| 6 | IF (t) OR (d) IS SANDWICHED BETWEEN TWO CONSONANTS, LIAISON OCCURS ((t) OR (d) IS NOT PRONOUNCED). |
| 7 | IF THE PREVIOUS WORD ENDS WITH (s), (z), (se), (ze), OR (ce) AND IF WORD CONCERNED STARTS WITH (s) OR (z), LIAISON OCCURS ("s-" SOUND IS PRONOUNCED LONGER THAN USUAL). |
| 8 | IF THE PREVIOUS WORD ENDS WITH CONSONANT AND IF WORD CONCERNED STARTS WITH THE SAME CONSONANT, LIAISON OCCURS (THE CONSONANT IS PRONOUNCED LONGER THAN USUAL). |
| 9 | IF THE PREVIOUS WORD ENDS WITH VOWEL AND IF WORD CONCERNED STARTS WITH VOWEL, LIAISON OCCURS ("j-" SOUND OR "w-" SOUND IS ADDED BETWEEN THE VOWELS). |
| 10 | IF THE PREVIOUS WORD ENDS WITH (s), (z), OR (ce) AND IF WORD CONCERNED STARTS WITH (y) OR (w), LIAISON OCCURS ("s-" SOUND AND "y-" SOUND BECOME "sh-" SOUND, AND "s-" SOUND AND "w-" SOUND BECOME "sw-" SOUND). |
| 11 | IF THE PREVIOUS WORD ENDS WITH (w) AND IF WORD CONCERNED STARTS WITH VOWEL, LIAISON OCCURS ("w-" SOUND IS ADDED TO THE VOWEL). |
| 12 | IF THE PREVIOUS WORD ENDS WITH (d) OR (to) AND IF WORD CONCERNED STARTS WITH (d), (t), (b), OR (p), LIAISON OCCURS (GLOTTAL CLOSURE OCCURS IN (d) OR (to) (ALLOPHONE)). |
| 13 | IF THE PREVIOUS WORD ENDS WITH (d) OR (to) AND IF WORD CONCERNED STARTS WITH (y), LIAISON OCCURS (THE TWO CHARACTERS ARE INTEGRATED TO GENERATE "j-" SOUND AND "ch-" SOUND). |

LIAISON RULES TABLE

*Fig. 16*

LEARNING SUPPORT SYSTEM AND LEARNING SUPPORT METHOD

CLAIM OF PRIORITY

The present application claims priority from Japanese patent application JP 2011-180253 filed on Aug. 22, 2011, the content of which is hereby incorporated by reference into this application.

BACKGROUND OF THE INVENTION

This invention relates to a learning support system for presenting a learner with questions appropriate to a degree of understanding of a learner and his/her skill level.

It is said that the presenting the learner with practice questions appropriate to the degree of understanding of the learner and his/her skill level increases motivation of the learner and enhances a learning effect. Further, there is a demand for "more personalized education" that provides detailed instruction suited to individual skills of the learner, which is represented by a tutorial cram school.

In order to provide such personalized learning appropriate to the learner, for example, JP 2003-66828 A discloses a method of determining a degree of difficulty of sentences in foreign languages in which the degree of difficulty or the like of each word is found based on data stored in a textbook database and the degree of difficulty is used to determine the degree of difficulty of arbitrary English sentences to be analyzed.

Further, JP 2002-108199 A discloses a learning testing method for providing the user with a comment and creating the next learning test based on a result of comparison between an answering time required for the user to input an answer and a reference answering time set in advance.

Further, JP 2007-271886 A discloses an ability value estimation method in which, in an examination using a computer, an answering time, which includes a question grasping time for grasping a question and a question answering time for answering to the question, is measured to estimate an ability value of an examinee based on the question grasping time, the question answering time, and correct/wrong of the question.

Further, JP 2006-309084 A discloses a certificate examination evaluation method in which, based on a selected time limit and answers to examination questions on an answer sheet, a correct answer count corresponding to the answer is detected and evaluation data is extracted from the correct answer count and the time limit.

Further, JP 2003-156996 A discloses a learning support system for acquiring answer information, analyzing the learner's ability based on the answer information, and distributing additional questions suited to each learner's individual abilities or evaluations of the learner based on analysis results.

The above-mentioned methods disclosed in JP 2003-66828 A, JP 2002-108199 A, JP 2007-271886 A, JP 2006-309084 A, and JP 2003-156996 A have the following problems.

For example, JP 2003-66828 A discloses a method using not only a correct answer rate but also a vocabulary level of a vocabulary used in an educational material. However, the vocabulary level differs between persons who have the same English ability. For example, the learner at a lower level may know a word that is unknown to the learner at an upper level, and vice versa. Therefore, with the method based on the vocabulary level, it is difficult to provide questions suited to individual skills.

Further, JP 2002-108199 A, JP 2007-271886 A, and JP 2006-309084 A discloses a method of estimating the ability by using the answering time. However, it is difficult to distinguish between a case where the learner happens to give a correct answer by randomly choosing an answer option and a case where the learner gives a correct answer with confidence. Further, it is conceivable that the learner who has memory of the past questions and the correct answers thereto may answer based on what he/she remembers. Therefore, with the method disclosed in JP 2002-108199 A, JP 2007-271886 A, and JP 2006-309084 A, it is difficult to measure actual language ability.

Further, JP 2003-156996 A discloses a method involving creating an educational purpose ability map and the degree of difficulty and creating a correspondence table thereof with respect to each question. However, an enormous amount of time and labor is required to create the questions and the map, and there is also a problem that only English materials created artificially for questions are used, which does not allow use of raw English materials that can be obtained from magazines, news, and the like.

In other words, the conventional methods cannot sufficiently achieve improvement in learning efficiency of the learner.

SUMMARY OF THE INVENTION

An object of this invention is to provide an learning support system for providing questions suited to skill levels of a learner.

The representative one of inventions disclosed in this application is outlined as follows. There is provided a learning support system which consists of a computer including a processor and a memory, comprising: a question database in which a question to be asked of an answerer is stored; a learning history database in which a result of giving an answer to the question asked of the answerer is recorded; a question generator for generating a question relating to a word changed in accordance with perturbation that changes a word, and stores the question in the question database; a question presentation module for asking the answerer the question extracted from the question database; an answer acquisition module for receiving the answer to the asked question; a scoring module for determining correct or wrong of the answer by referring to the question database; and an achievement degree estimator, for storing a result of the determination in the learning history database. The achievement degree estimator compares a number of types of perturbation within the questions to which a correct answer has been given with a predetermined second threshold value. The question generator generates a word changed in accordance with the perturbation of a different type in a case where the number of types of perturbation within the questions to which the correct answer has been given is smaller than the predetermined second threshold value, and sets a question relating to the generated word as a candidate for the question.

According to the representative aspect of this invention, the questions suited to a degree of achievement of the learner are provided, and hence it is possible to improve learning efficiency.

BRIEF DESCRIPTION OF THE DRAWINGS

The present invention can be appreciated by the description which follows in conjunction with the following figures, wherein:

FIG. 6 is a diagram illustrating a configuration of a antonym table according to the first embodiment;

FIG. 7 is a diagram illustrating a configuration of a modification rules table according to the first embodiment.

FIG. 8 is a diagram illustrating a configuration of a question database according to the first embodiment;

FIG. 16 is a diagram illustrating a configuration of a liaison rules table according to a modified example of the first embodiment;

DETAILED DESCRIPTION OF THE PREFERRED EMBODIMENTS (First Embodiment)

Figure 1:
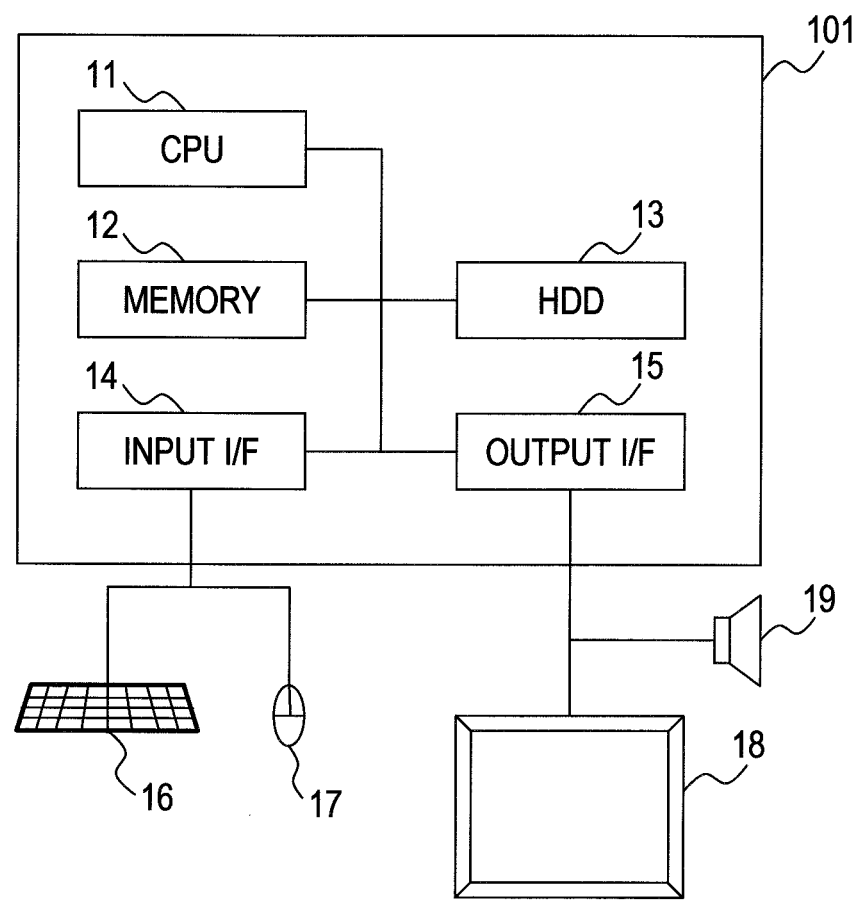
FIG. 1 is a block diagram illustrating a hardware configuration of a learning support system according to a first embodiment of this invention.

FIG. 1 is a block diagram illustrating a hardware configuration of a learning support system 101 according to a first embodiment of this invention.

The learning support system 101 according to the first embodiment is a computer including a processor (CPU) 11, a memory 12, a storage device (HDD) 13, an input interface 14, and an output interface 15. It should be noted that the learning support system 101 may include a network interface for performing communications with another computer.

The processor 11 executes a program stored in the memory 12. The memory 12 is, for example, a high-speed volatile storage device such as a dynamic random access memory (DRAM) and stores the program executed by the processor 11 and data used when the program is executed. The storage device 13 is, for example, a large-capacity nonvolatile storage device such as a magnetic storage device or a flash memory and stores the program executed by the processor 11 and the data used when the program is executed. In other words, the program executed by the processor 11 is read from the storage device 13 and loaded into the memory 12 to be executed by the processor 11.

The input interface 14 receives inputs from a keyboard 16 and a mouse 17 that are input devices. The output interface 15 is connected to a display 18 and speakers 19 that are output devices, and outputs a signal for displaying an image on the display 18 and a sound signal for outputting sound from the speakers 19.

Figure 2:
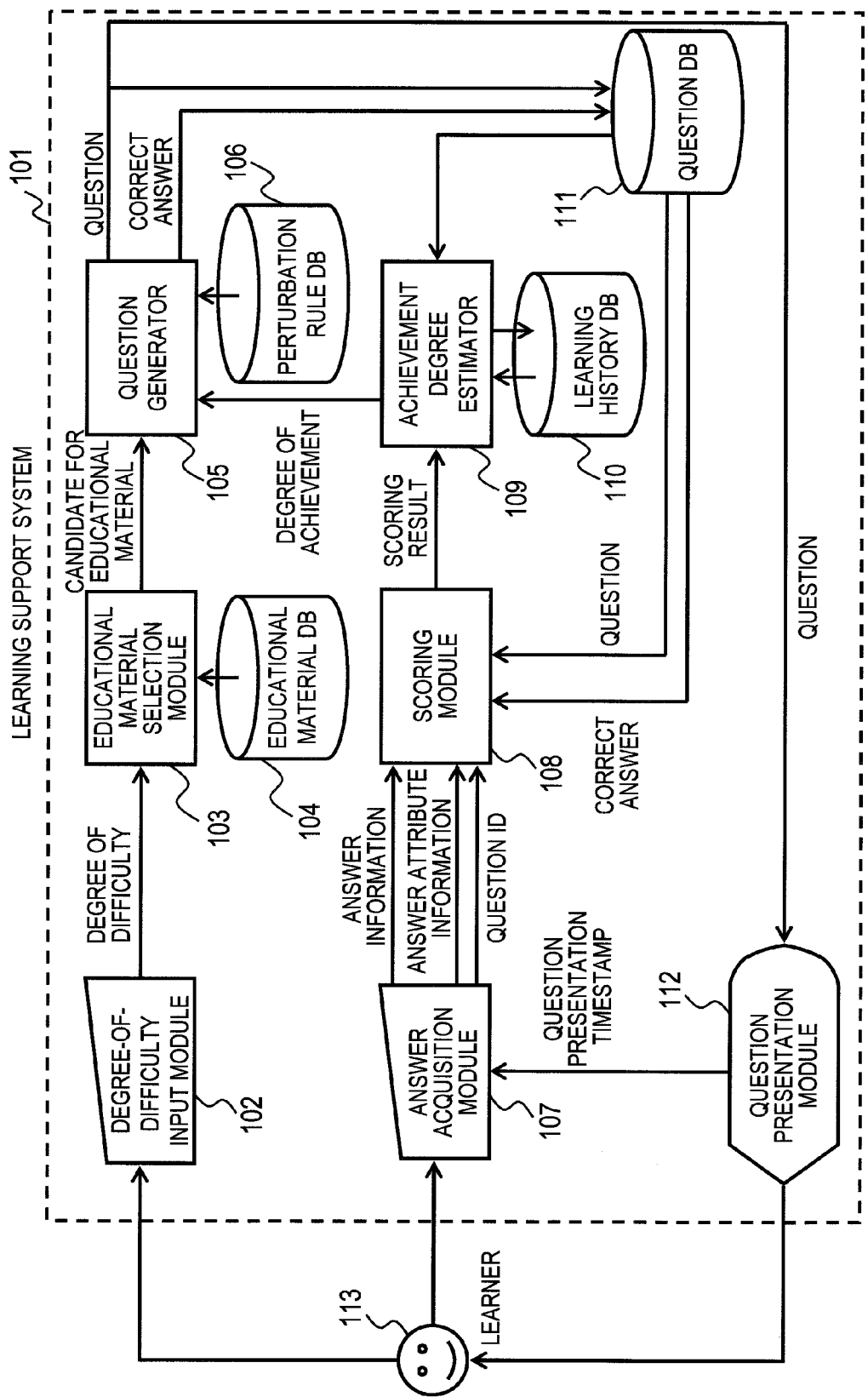
FIG. 2 is a functional block diagram illustrating a configuration of the learning support system according to the first embodiment.

FIG. 2 is a functional block diagram illustrating a configuration of the learning support system 101 according to the first embodiment.

The learning support system 101 according to the first embodiment includes a degree-of-difficulty input module 102, an educational material selection module 103, a question generator 105, an answer acquisition module 107, a scoring module 108, an achievement degree estimator 109, and a question presentation module 112. Each of those modules is implemented by the processor 11 executing a predetermined program.

Figure 3:
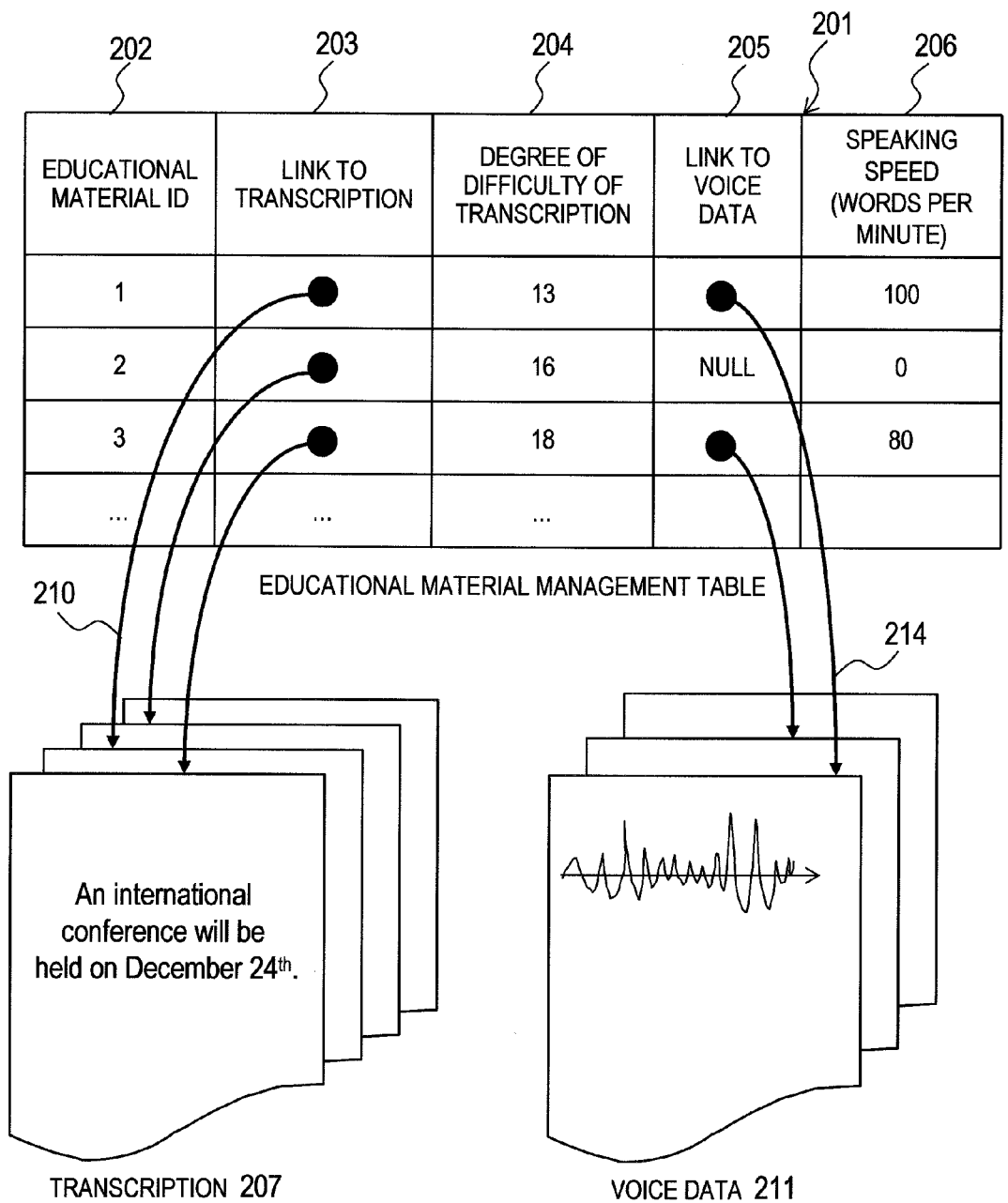
FIG. 3 is a diagram illustrating a configuration of an educational material database according to the first embodiment.
Figure 5:
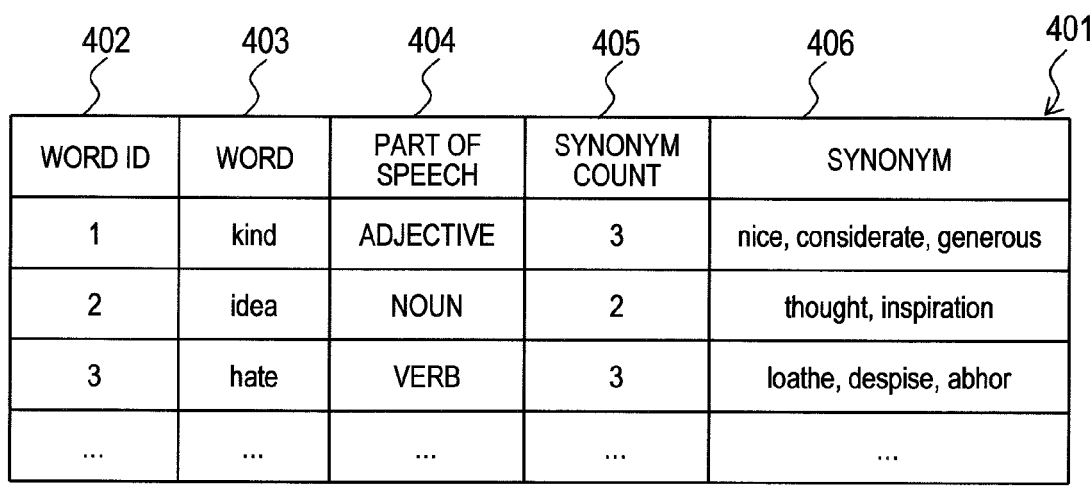
FIG. 5 is a diagram illustrating a configuration of a synonym table according to the first embodiment.
Figure 9:
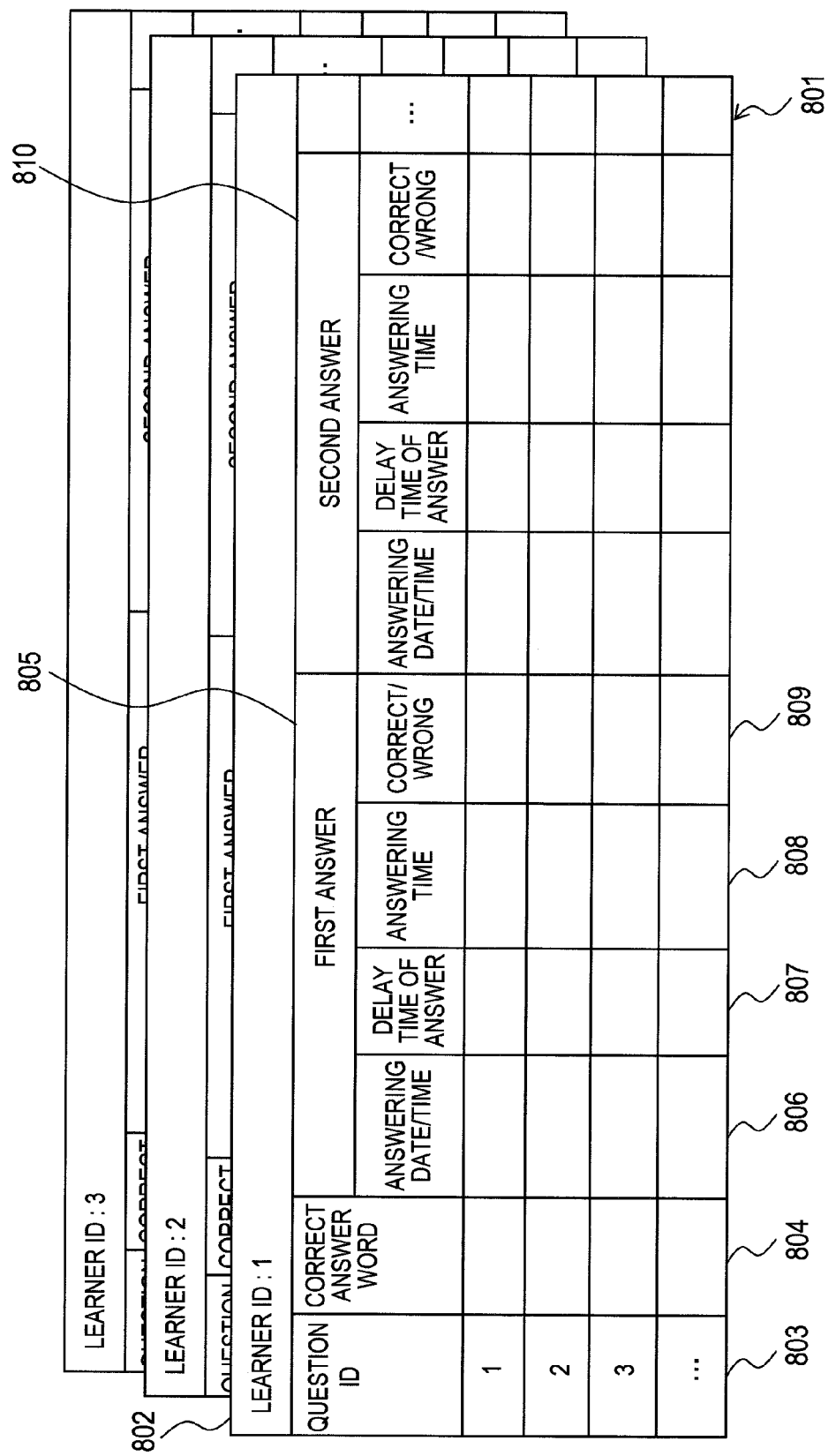
FIG. 9 is a diagram illustrating a configuration of a learning history database according to the first embodiment.

The storage device 13 stores an educational material database 104 as illustrated in FIG. 3, a perturbation rule database 106 as illustrated in FIG. 5, FIG. 6, and FIG. 7, a learning history database 110 as illustrated in FIG. 9, and a question database 111 as illustrated in FIG. 8.

The degree-of-difficulty input module 102 decides a degree of difficulty of questions to be asked based on an age input by a learner 113. In this embodiment, the age of a learner is used for the degree of difficulty, but another index (for example, school year) may be used. It should be noted that it may be possible to change the degree of difficulty based on the age (for example, ±1 or 0 to +2).

The educational material selection module 103 searches the educational material database 104 by using the input degree of difficulty to select an educational material (transcription) to be a basis for creating the questions.

The question generator 105 refers to the degree of achievement of the learner 113 and the perturbation rule database 106 by using the educational material selected by the educational material selection module 103 to generate questions and correct answers, and stores the generated questions and correct answers in the question database 111 while sending the same to the question presentation module 112. Processings executed by the question generator 105 are described later by referring to FIG. 12A, FIG. 12B, and FIG. 20.

The question presentation module 112 selects a question to be asked from candidates for the question stored in the question database 111, and provides the selected question to the learner 113 by displaying the selected question on the display 18 and outputting a voice signal from the speakers 19. The learner 113 solves the question provided by the question presentation module 112, and inputs an answer by using the input devices (such as keyboard 16 and mouse 17). In particular, an learning support system according to this embodiment is a system suitable for asking a question of a so-called dictation test for listening to an English sentence being read aloud and writing down the same English sentence. Further, the learning support system is a system also suitable for asking a question of a so-called blank filling question for listening to an English sentence being read aloud and filling in blanks partially included in the same English sentence. Thus, the question presentation module 112 outputs an English sentence from the speakers 19 by the voice signal, and displays the English sentence whose part (portion to be asked) lacks on the display 18.

The answer acquisition module 107 acquires an answer input by the learner 113 using the input devices, and outputs answer information, answer attribute information, and a question ID. The answer information is the answer input by the learner 113 itself. The answer attribute information is information representing a time required to give the answer, for example, a time that passes after outputting of the voice of the question ends until the answer has been given. The answer acquisition module 107 acquires a question presentation timestamp representing a time at which the question presentation module 112 presents (finishes reading aloud) the word of a question portion, and acquires an answer input start timestamp and an answer input end timestamp that represent times at which the learner starts and finishes inputting the answer. Then, the answer acquisition module 107 sets a difference between the answer input start timestamp and the answer input end timestamp as an answering time, and sets a difference between the question presentation timestamp and the answer input end timestamp as a delay time of the answer. The calculated answering time and the delay time of the answer are stored in the learning history database 110 as illustrated in FIG. 9. The question ID is an ID of the question presented by the question presentation module 112, and the ID displayed on the display 18 when the question is provided may be acquired when the answer is input.

The scoring module 108 searches the question database 111 with the question ID output from the answer acquisition module 107 as a key to acquire the correct answer. Then, the scoring module 108 compares the answer output from the answer acquisition module 107 and the acquired correct answer with each other to thereby determine whether the answer input by the learner 113 is correct or wrong and output a scoring result. A result of the determination of the correct/wrong performed by the scoring module 108 is stored in the learning history database 110 by the achievement degree estimator 109.

The achievement degree estimator 109 refers to the learning history database 110 by using the scoring result output from the scoring module 108 to thereby calculate the degree of achievement. The calculated degree of achievement is input to the question generator 105. The achievement degree estimator 109 stores the scoring result output from the scoring module 108 in the learning history database 110. A processing executed by the achievement degree estimator 109 is described later by referring to FIG. 10.

It should be noted that a description of this embodiment is directed to an example in which the learner 113 directly operates the learning support system 101, but the learning support system 101 may be configured to couple to a computer operated by the learner 113 through a communication line (e.g a network), the learning support system 101 transmits questions to the computer for the learner, and the computer for the learner transmits answers to the learning support system 101. In this case, it suffices that the computer for the learner has a function of displaying a question transmitted from the learning support system 101 on a screen and transmitting an answer input by the learner 113 to the learning support system 101, and this function can be realized by, for example, a web browser.

FIG. 3 is a diagram illustrating a configuration of the educational material database 104 according to the first embodiment.

The educational material database 104 includes an educational material management table 201, a transcription 207, and voice data 211, and has a configuration in which the educational material management table 201 is associated with the transcription 207 by links 210 and also associated with the voice data 211 by links 214.

The educational material management table 201 includes an educational material ID 202, a link 203 to the transcription, a degree of difficulty 204 of the transcription, a link 205 to the voice data, and a speaking speed 206.

The educational material ID 202 is a unique identifier for identifying the educational material. The link 203 to the transcription is information used for access to the transcription 207 being the educational material, and, for example, an identifier of the transcription or an identifier of a storage location of the transcription can be used as the link 203. The degree of difficulty 204 of the transcription is a value generated from the degree of difficulty of words included in the transcription. The link 205 to the voice data is information used for access to the voice data 211 obtained by reading aloud the transcription 207 being the educational material, and, for example, an identifier of the voice data or an identifier of a storage location of the voice data can be used as the link 205. The speaking speed 206 is a speed of the reading aloud of the voice data 211, and can be defined by, for example, the number of words per minute.

After being processed into the question, the transcription 207 is output from the question presentation module 112 and displayed on the display 18. Further, the voice data 211 is output from the question presentation module 112 and output from the speakers 19 as the sound signal.

Figure 4:
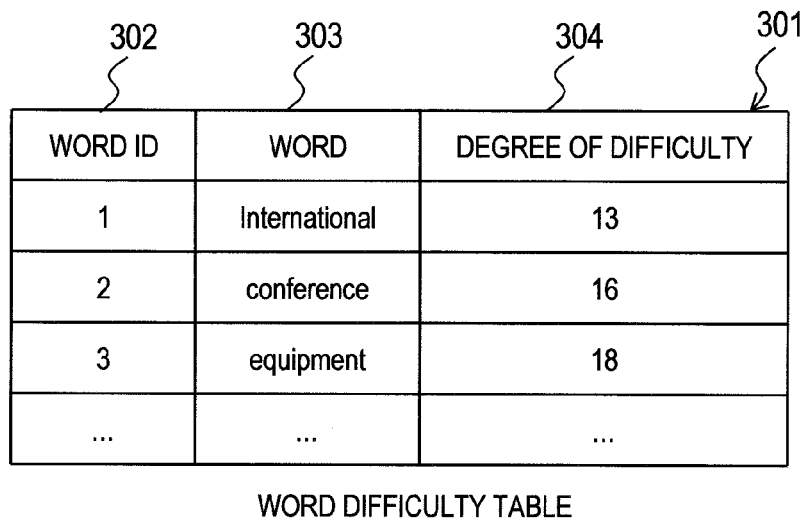
FIG. 4 is a diagram illustrating a configuration of a word difficulty table according to the first embodiment.

FIG. 4 is a diagram illustrating a configuration of a word difficulty table 301 according to the first embodiment.

The word difficulty table 301, which is used to estimate an educational material difficulty, includes a word ID 302, a word 303, and a degree of difficulty 304, and is generated by a processing (FIG. 14) for generating a word difficulty table.

The word difficulty table 301 may be a part of the educational material database 104. Alternatively, the word difficulty table 301 may be created by another device, and in a case of being introduced into the learning support system 101 according to this embodiment, the word difficulty table 301 may be included by the another device.

The word ID 302 is a unique identifier for identifying a word used to estimate the degree of difficulty. The word 303 is the word used to estimate the degree of difficulty. The degree of difficulty 304 is a word difficulty, and, for example, the age at which the learner 113 is desired to understand the word can be used as the degree of difficulty 304.

The perturbation rule database 106 includes a synonym table 401 (FIG. 5), an antonym table 501 (FIG. 6), and a modification rules table 601 (FIG. 7), which correspond to types of perturbation. It should be noted that the perturbation rule database 106 does not need to include all of the synonym table 401, the antonym table 501, and the modification rules table 601. If at least two thereof are included, the type of perturbation can be changed, and if at least one thereof is included, perturbation can be changed (in other words, the word can be modified) within the same type of perturbation.

In this embodiment, the "perturbation" is to apply a minute modification to the word representation within sentences, and more specifically, to replace an English word within the sentences by an antonym or a synonym and further modify an English word in accordance with a predetermined rule such as the present tense form/past tense form or the singular form/plural form. Learning the English sentences including words replaced by antonyms or synonyms or modified words improves comprehension of English sentences, in particular, listening comprehension thereof.

FIG. 5 is a diagram illustrating a configuration of the synonym table 401 according to the first embodiment.

The synonym table 401 is a table in which a synonym that can replace a word within a sentence is registered, and includes a word ID 402, a word 403, a part of speech 404, a synonym count 405, and a synonym 406.

The word ID 402 is a unique identifier for identifying the word registered in the synonym table 401. It should be noted that the word ID 402 may be the same identifier as the word ID 302 of the word difficulty table 301, or may be an identifier unique within the synonym table 401.

The part of speech 404 is a part of speech of the word registered in the word 403. The synonym count 405 is the number of words registered in the synonym 406. The synonym 406 is the synonym of the word registered in the word 403.

FIG. 6 is a diagram illustrating a configuration of the antonym table 501 according to the first embodiment.

The antonym table 501 is a table in which an antonym that can replace a word within a sentence is registered, and includes a word ID 502, a word 503, a part of speech 504, an antonym count 505, and an antonym 506.

The word ID 502 is a unique identifier for identifying the word registered in the antonym table 501. It should be noted that the word ID 502 may be the same identifier as the word ID 302 of the word difficulty table 301, or the same identifier as the word ID 402 of the synonym table 401, or may be an identifier unique within the antonym table 501.

The part of speech 504 is a part of speech of the word registered in the word 503. The antonym count 505 is the number of words registered in the antonym 506. The antonym 506 is the antonym of the word registered in the word 503.

FIG. 7 is a diagram illustrating a configuration of the modification rules table 601 according to the first embodiment.

The modification rules table 601 includes a rule ID 602 and a rule 603.

The rule ID 602 is a unique identifier for identifying a modification rule registered in the modification rules table 601. The rule 603 is a rule for modifying the word within the sentence. For example, the rule whose rule ID is "1" is a rule for converting the present tense form and the past tense form into each other, the rule whose rule ID is "2" is a rule for converting the root form and the third person singular form in the present tense into each other, and the rule whose rule ID is "3" is a rule for converting the singular form and the plural form into each other.

FIG. 8 is a diagram illustrating a configuration of the question database 111 according to the first embodiment.

The question database 111 is a database in which the questions generated by the question generator 105 are stored, and includes a question ID 702, an educational material ID 703, an original question ID 704, a perturbation group ID 705, a perturbation ID 706, a perturbed word 707, a voice start timestamp 708, a voice end timestamp 709, and a co-occurrence word 710.

The question ID 702 is a unique identifier for identifying the question registered in the question database 111. The educational material ID 703 is a unique identifier for identifying the educational material used when the questions are created. The original question ID 704 is an identifier of the question that is a basis for generating the question in the case where the question is generated in accordance with the perturbation.

The perturbation group ID 705 is an identifier indicating the type of perturbation used for the creation of the question. The perturbation ID 706 is a unique identifier for identifying the perturbation used for the creation of the question. The perturbed word 707 is a word obtained after modifying the word to be asked in accordance with the perturbation (in other words, word to be answered by the learner).

The voice start timestamp 708 represents a time at which reading aloud of the word to be asked starts within the voice data, and the voice end timestamp 709 represents a time at which the reading aloud of the same word ends within the voice data.

The co-occurrence word 710 is a word used along with the word to be asked.

FIG. 9 is a diagram illustrating a configuration of the learning history database 110 according to the first embodiment.

The learning history database 110 is provided with a table 802 for each learner ID, and table 802 includes a question ID 803, a correct answer word 804, a first answer 805, a second answer 810, and so forth.

The first answer 805 includes an answering date/time 806, a delay time 807 of the answer, an answering time 808, and correct/wrong 809 which relate to the first answer. It should be noted that the second answer 810 includes the same data relating to the second answer.

The question ID 803 is a unique identifier for identifying the question registered in the question database 111, and the same identifier as the question ID 702 of the question database 111 (FIG. 8) according to the first embodiment is used as the question ID 803. The correct answer word 804 is a word to be answered by the learner as the correct answer.

The answering date/time 806 is a date/time at which inputting of the answer is finished. The delay time 807 of the answer is a time that passes after the reading aloud of the word ends (voice end timestamp 709) until the learner finishes inputting the answer. The answering time 808 is a time required by the learner to input the answer (in other words, time that passes after the learner starts inputting the answer until the learner finishes inputting the answer). The correct/wrong 809 indicates whether or not the answer input by the learner matches the correct answer.

It should be noted that FIG. 3 to FIG. 9 illustrate an example in which each of the databases is configured in a table format, but another format may be employed.

Figure 10:
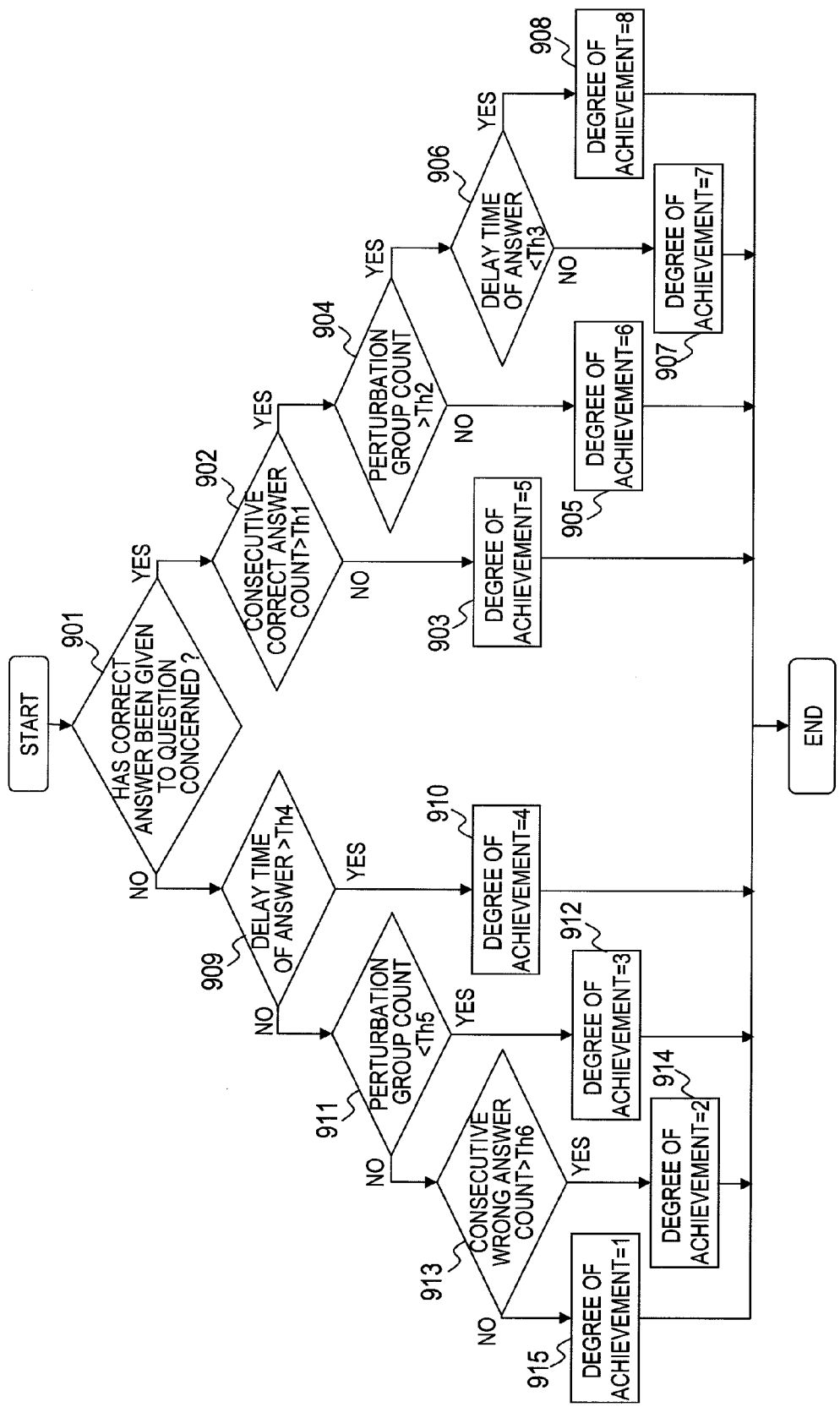
FIG. 10 is a flowchart of a processing executed by an achievement degree estimator according to the first embodiment.

FIG. 10 is a flowchart of the processing executed by the achievement degree estimator 109 according to the first embodiment.

First, the achievement degree estimator 109 determines whether or not a correct answer has been given to a question concerned (901).

As a result, when the question concerned is correctly answered, the achievement degree estimator 109 compares a consecutive correct answer count with a predetermined threshold value (Th1) (902). As a result, when the consecutive correct answer count is equal to or smaller than the predetermined threshold value (Th1), the achievement degree estimator 109 determines that the learning has not been performed enough to give the correct answer consecutively a predetermined number of times, and sets the degree of achievement to 5 (903).

On the other hand, when the consecutive correct answer count exceeds the predetermined threshold value (Th1), the achievement degree estimator 109 determines that the learning has been performed enough to give the correct answer consecutively a predetermined number of times, and compares the number of types of perturbation included in the question to which the correct answer has been given with a predetermined threshold value (Th2) (904). As a result, when the number of types of perturbation is equal to or smaller than the predetermined threshold value (Th2), the achievement degree estimator 109 determines that the learning about the perturbation has been performed insufficiently, and sets the degree of achievement to 6 (905).

On the other hand, when the number of perturbation groups exceeds the predetermined threshold value (Th2), the learning about the perturbation has been performed sufficiently, and hence the achievement degree estimator 109 compares the delay time of the answer with a predetermined threshold value (Th3) (906). As a result, when the delay time of the answer is equal to or larger than the predetermined threshold value (Th3), the achievement degree estimator 109 determines that the answer has taken long, and sets the degree of achievement to 7 (905). On the other hand, when the delay time of the answer is smaller than the predetermined threshold value (Th3), the achievement degree estimator 109 determines that the answer has been given quickly, and sets the degree of achievement to 8 (905).

Meanwhile, when it is determined in Step 901 that a wrong answer has been given to the question concerned, the achievement degree estimator 109 compares the delay time of the answer with a predetermined threshold value (Th4) (909). As a result, when the delay time of the answer is larger than the predetermined threshold value (Th4), the answer has taken long, and hence the achievement degree estimator 109 sets the degree of achievement to 4 (910).

On the other hand, when the delay time of the answer is equal to or smaller than the predetermined threshold value (Th4), the achievement degree estimator 109 compares the number of types of perturbation within the questions to which the correct answer has been given with a predetermined threshold value (Th5) (911). As a result, when the number of types of perturbation is smaller than the predetermined threshold value (Th5), the achievement degree estimator 109 determines that the learning about the perturbation has been performed insufficiently, and sets the degree of achievement to 3 (912).

On the other hand, when the number of perturbation groups is equal to or larger than the predetermined threshold value (Th5), the achievement degree estimator 109 determines that the learning about the perturbation has been performed intensely, and compares a consecutive wrong answer count with a predetermined threshold value (Th6) (913). As a result, when the consecutive wrong answer count is larger than the predetermined threshold value (Th6), the consecutive wrong answer count is large, and hence the achievement degree estimator 109 sets the degree of achievement to 2 (914). On the other hand, when the consecutive wrong answer count is equal to or smaller than the predetermined threshold value (Th6), the achievement degree estimator 109 sets the degree of achievement to 1 (915).

In this manner, in this embodiment, based on the correct/wrong, the delay time of the answer, the type of perturbation group, the consecutive correct answer count, and the consecutive wrong answer count which relate to the question concerned, a weak point of the learner is found, and the degree of achievement is determined.

Figure 11:
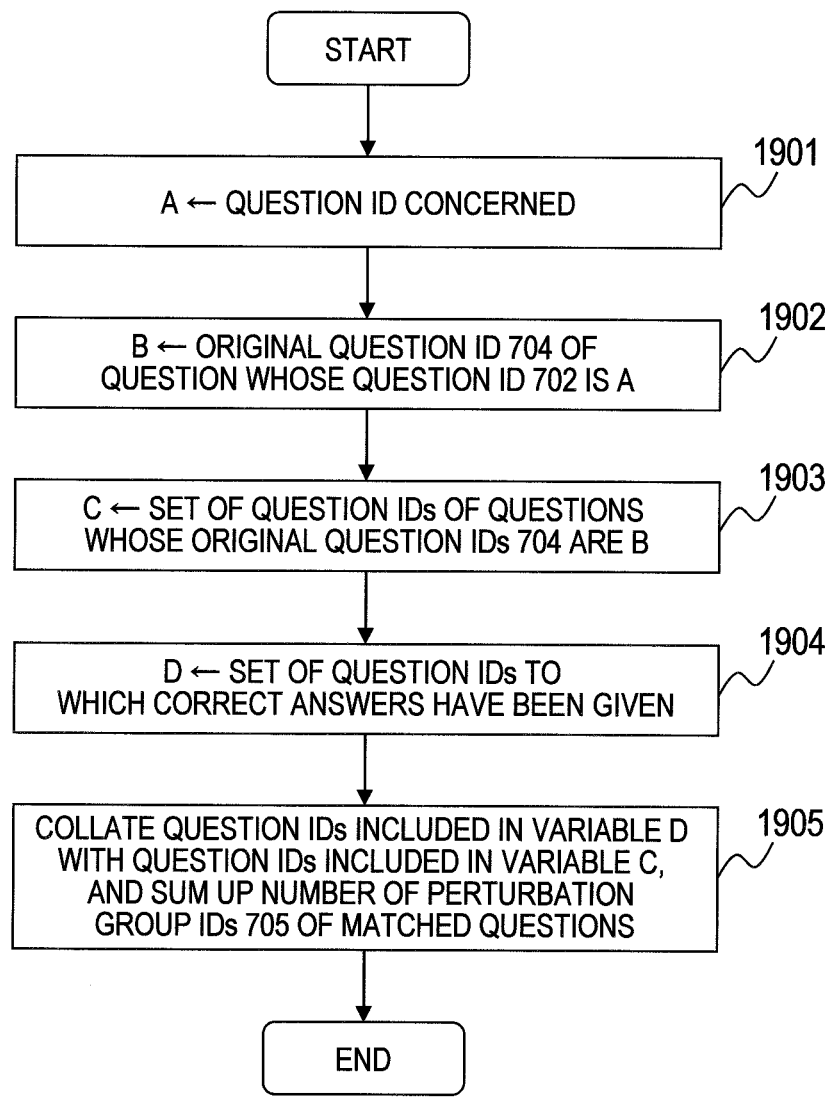
FIG. 11 is a flowchart of a processing for counting a number of perturbation groups according to the first embodiment.

FIG. 11 is a flowchart of a processing for counting the number of perturbation groups according to the first embodiment. The counted number of perturbation groups is used in Steps 904 and 911 of FIG. 10.

First, the achievement degree estimator 109 sets the question ID of the question concerned as a variable A (1901). After that, the achievement degree estimator 109 refers to the question database 111 to set the original question ID 704 of the question whose question ID 702 is equal to A as a variable B (1902).

After that, the achievement degree estimator 109 refers to the question database 111 to set a set of the question IDs 702 whose original question IDs 704 are equal to B as a variable C (1903). After that, the achievement degree estimator 109 refers to the learning history database 110 to set the set of the question IDs of the questions to which the correct answers have been given as a variable D (1904).

After that, the achievement degree estimator 109 collates the question IDs included in the variable D and the question IDs included in the variable C, and refers to the question database 111 to sum up the number of perturbation group IDs 705 corresponding to the questions whose question IDs match (1905).

By the above-mentioned processing, the number of types of perturbation within the questions to which the correct answers have been given among the questions generated from the same question is summed up. This allows counting of the number of types of perturbation to which the correct answer has been given.

Figure 12A:
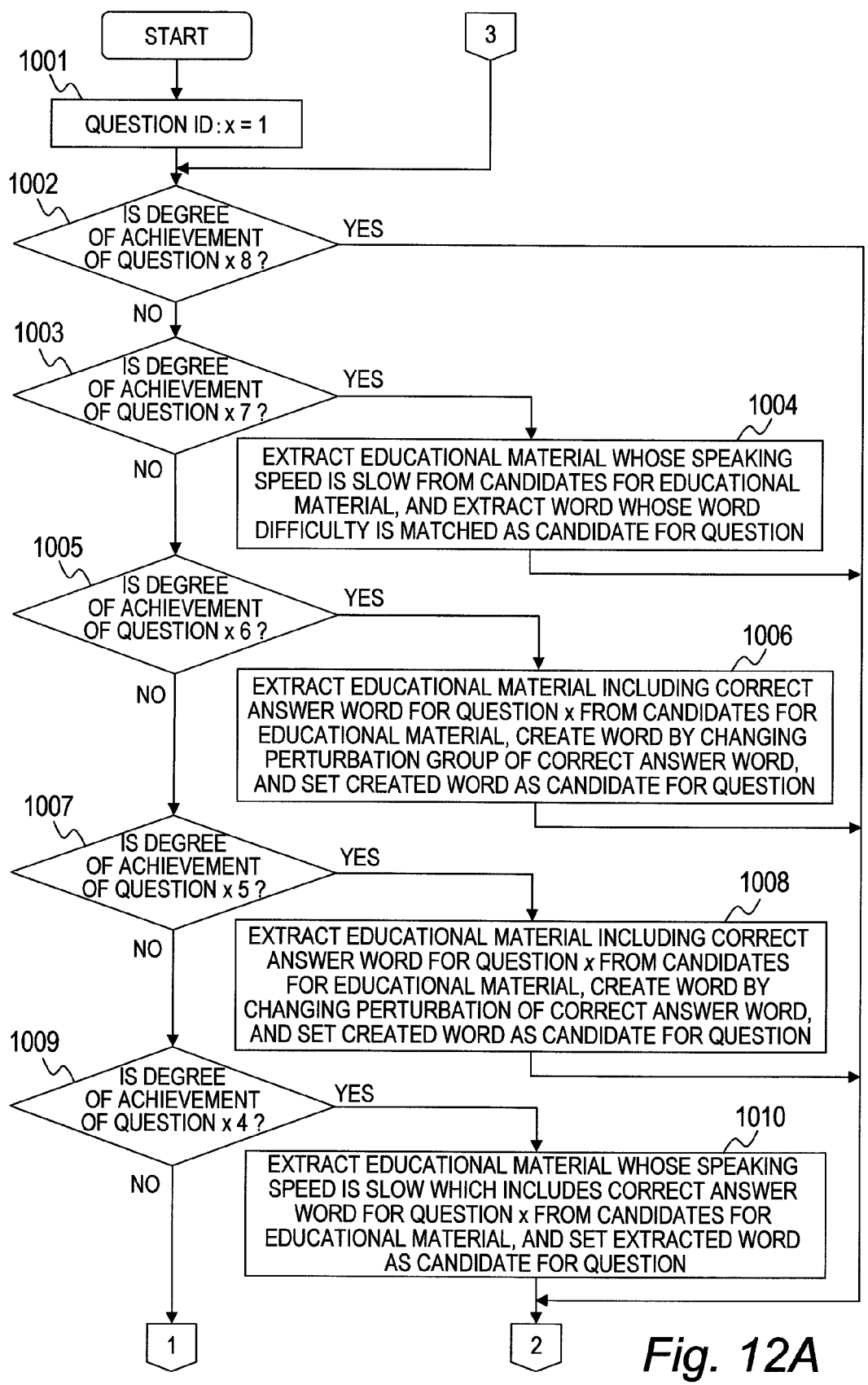
FIG. 12A and FIG. 12B are flowcharts of a question generating processing according to the first embodiment.
Figure 12B:
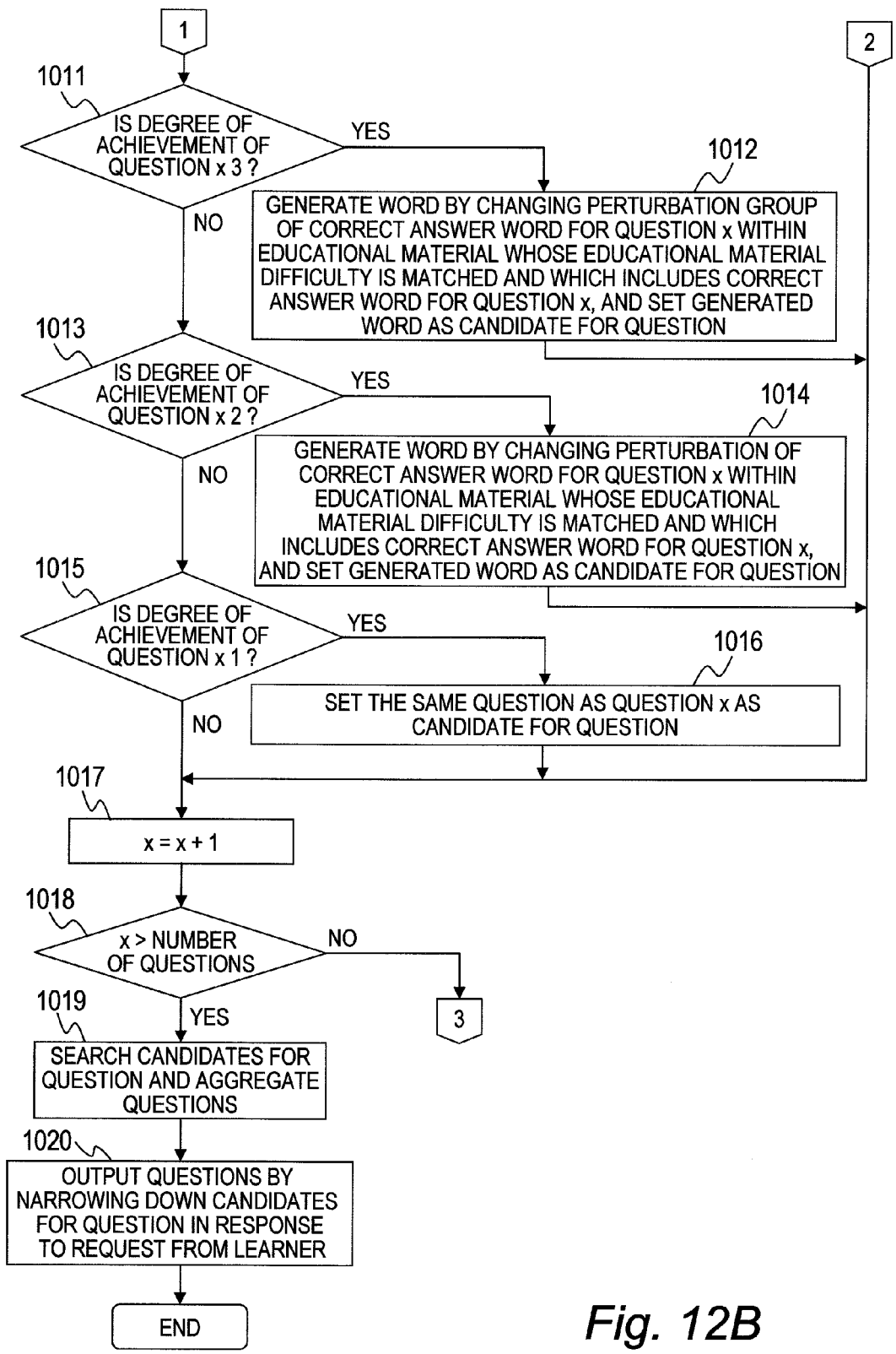

FIG. 12A and FIG. 12B are flowcharts of a question generating processing performed by the question generator 105 according to the first embodiment.

First, the question generator 105 initializes a question ID (x) to 1 (1001). After that, the question generator 105 causes the processing to branch off based on the degree of achievement of a question x, and creates the candidates for the question corresponding to the respective degrees of achievement.

First, the question generator 105 determines whether or not the degree of achievement of the question x is 8 (1002). When the degree of achievement of the question x is 8, the learner has learned about the question x sufficiently, and hence the question generator 105 advances to Step 1017 without creating the candidates for the question, and shifts to the next question.

Subsequently, the question generator 105 determines whether or not the degree of achievement of the question x is 7 (1003). When the degree of achievement of the question x is 7, the answer has taken long, and hence it is desired that the time until the answer is given be reduced, in other words, the speed for understanding English be improved. For this reason, the question generator 105 extracts the educational material whose speaking speed is slow from candidates for the educational material, and extracts the word whose word difficulty is matched as the candidate for the question (1004).

Subsequently, the question generator 105 determines whether or not the degree of achievement of the question x is 6 (1005). When the degree of achievement of the question x is 6, the learning about the perturbation has been performed insufficiently, and hence it is desired that the learning be continued by changing a pattern. For this reason, the question generator 105 extracts the educational material including a correct answer word for the question x from the candidates for the educational material, creates a word by changing the correct answer word so as to have a different group of perturbation, and sets the created word as the candidate for the question (1006).

Subsequently, the question generator 105 determines whether or not the degree of achievement of the question x is 5 (1007). When the degree of achievement of the question x is 5, the consecutive correct answer count is small, and the learned contents have not been firmly acquired. For this reason, the question generator 105 extracts the educational material including the correct answer word for the question x from the candidates for the educational material, creates a word by changing the correct answer word so as to have different perturbation belonging to the same group of perturbation, and sets the created word as the candidate for the question (1008).

Subsequently, the question generator 105 determines whether or not the degree of achievement of the question x is 4 (1009). When the degree of achievement of the question x is 4, the answer has taken long, and hence it is desired that the time until the answer is given be reduced, in other words, the speed for understanding English be improved. For this reason, the question generator 105 extracts the educational material whose speaking speed is slow and which includes the correct answer word for the question x from candidates for the educational material, and sets the word as the candidate for the question (1010).

Subsequently, the question generator 105 determines whether or not the degree of achievement of the question x is 3 (1011). When the degree of achievement of the question x is 3, the learning about the perturbation has been performed insufficiently, and hence it is desired that the learning be continued by changing the pattern. For this reason, the question generator 105 generates a word by changing the correct answer word within the educational material whose educational material difficulty is matched and which includes the correct answer word for the question x so as to have a different group of perturbation, and sets the generated word as the candidate for the question (1012).

Subsequently, the question generator 105 determines whether or not the degree of achievement of the question x is 2 (1013). When the degree of achievement of the question x is 2, there are a large number of consecutive wrong answers, the learning has been performed insufficiently as a whole, and hence the question generator 105 generates a word by changing the correct answer word within the educational material whose educational material difficulty is matched and which includes the correct answer word for the question x so as to have different perturbation belonging to the same group of perturbation, and sets the generated word as the candidate for the question (1014).

Subsequently, the question generator 105 determines whether or not the degree of achievement of the question x is 1 (1015). When the degree of achievement of the question x is 1, there are a small number of consecutive wrong answers, and hence the question generator 105 determines that the learning about the question x has been performed insufficiently, and sets the same question as the question x as the candidate for the question (1016).

After that, in order to create the candidate for the question with regard to the next question, the question generator 105 adds 1 to the question ID (x) (1017).

After that, the question generator 105 determines whether or not the question ID (x) is larger than the number of questions (1018). When the question ID (x) is larger than the number of questions, the creation of all the questions has already been finished, and hence the question generator 105 searches the candidates for the question and aggregates the questions by deleting one of the same questions (1019). On the other hand, when the question ID (x) does not exceed the number of questions, there is a question left to be created, and hence the question generator 105 returns to Step 1002. After that, the question presentation module 112 outputs questions by narrowing down the candidates for the question in response to a request from the learner (1020). The request from the learner relates to, for example, the learning time or the number of questions.

Figure 13A:
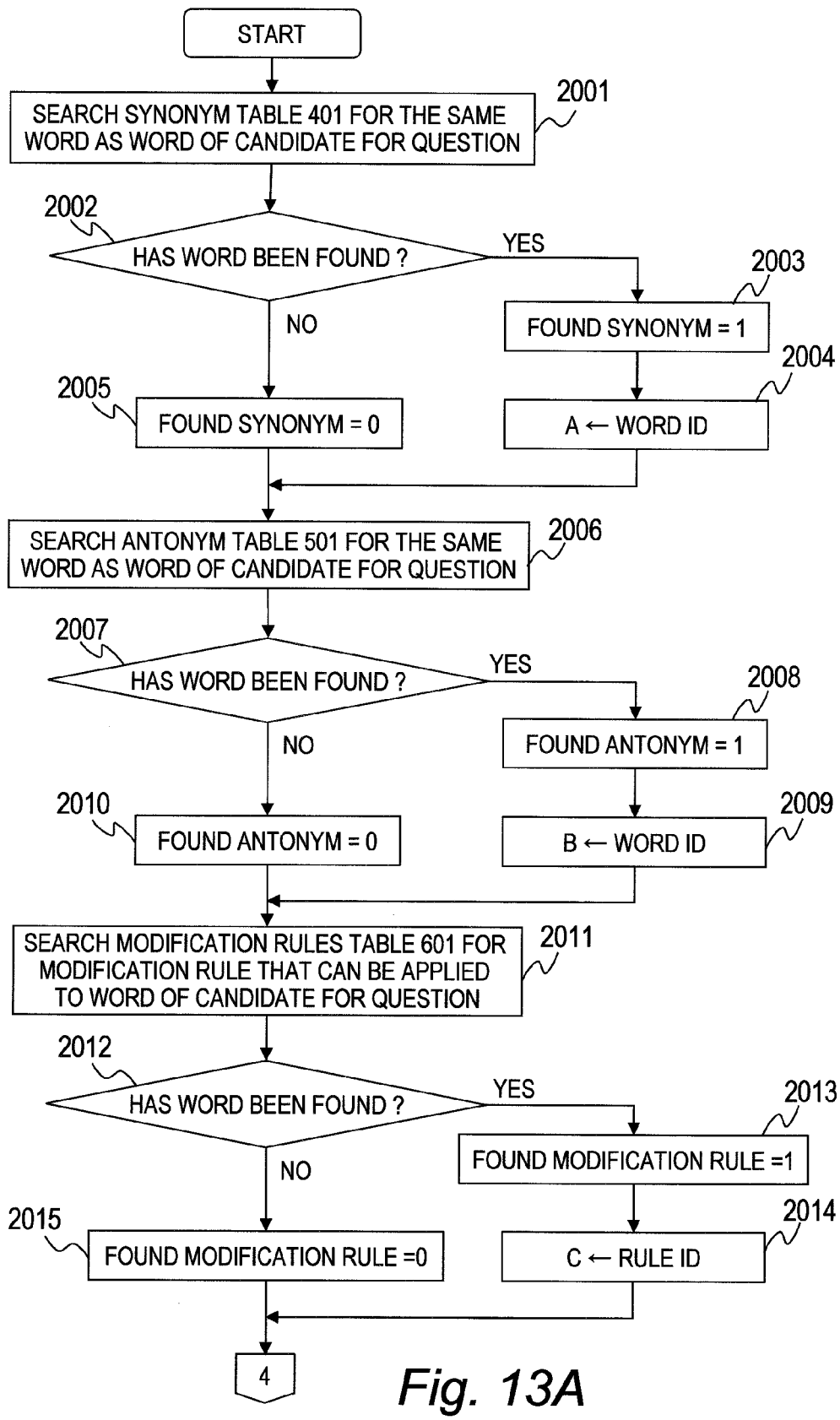
FIG. 13A and FIG. 13B are flowcharts of a processing for changing a perturbation according to the first embodiment.
Figure 13B:
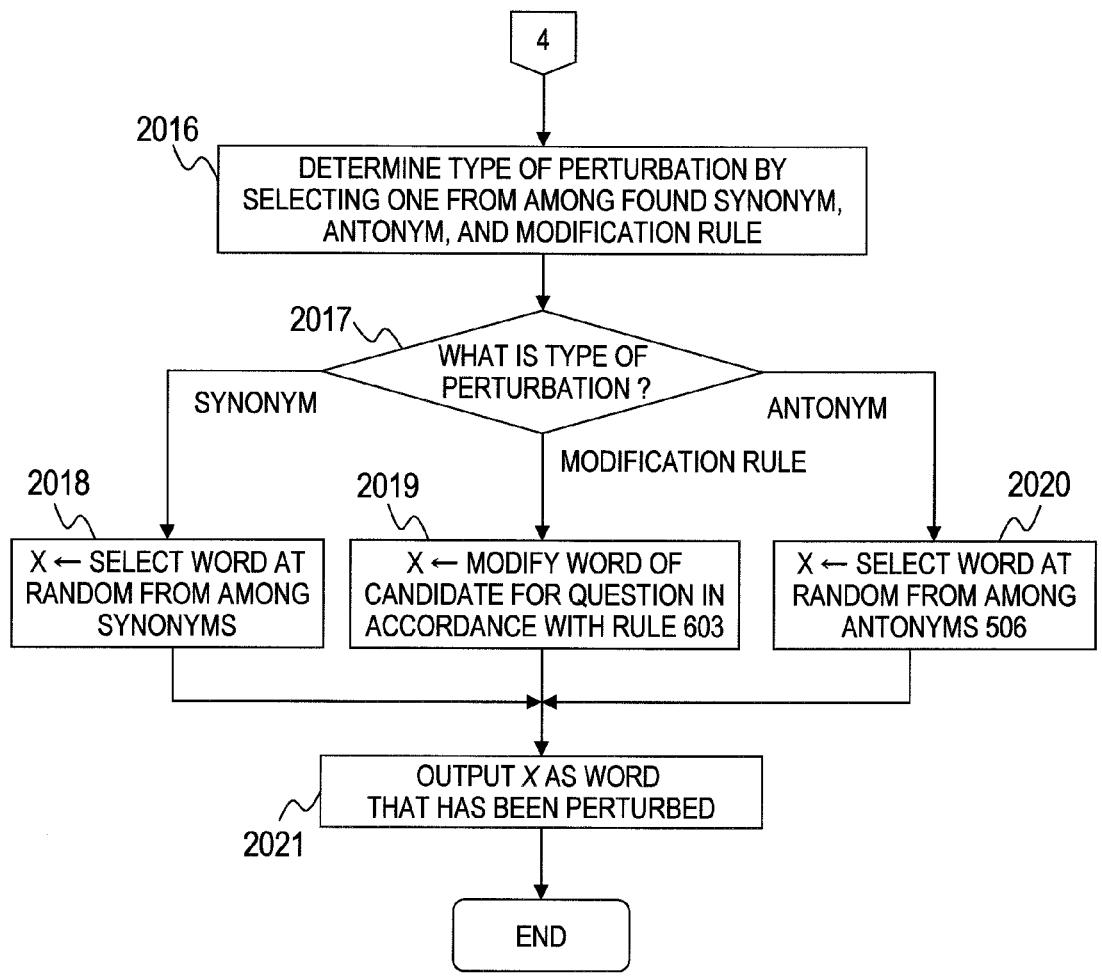

FIG. 13A and FIG. 13B are flowcharts of a processing for changing the perturbation according to the first embodiment, and illustrate details of the processings executed by the question generator 105 in Steps 1006, 1008, 1012, and 1014.

First, the question generator 105 refers to the synonym table 401 to search for the same word 403 as the candidate for the question (2001). As a result, when the same word is found (YES in 2002), the question generator 105 sets a variable "FoundSynonym" to 1 (2003), and sets the word ID 402 of the found word as the variable A (2004). On the other hand, when the same word is not found (NO in 2002), the question generator 105 sets the variable "FoundSynonym" to 0 (2005).

Next, the question generator 105 refers to the antonym table 501 to search for the same word 503 as the candidate for the question (2006). As a result, when the same word is found (YES in 2007), the question generator 105 sets a variable "FoundAntonym" to 1 (2008), and sets the word ID 502 of the found word as the variable B (2009). On the other hand, when the same word is not found (NO in 2007), the question generator 105 sets the variable "FoundAntonym" to 0 (2010).

Next, the question generator 105 refers to the modification rules table 601 to search for a modification rule applicable to the word as the candidate for the question (2011). As a result, when an applicable modification rule is found (YES in 2012), the question generator 105 sets a variable "FoundModificationRule" to 1 (2013), and sets the rule ID 602 of the found modification rule as the variable C (2014). On the other hand, when no applicable modification rule is found (NO in 2012), the question generator 105 sets the variable "FoundModificationRule" to 0 (2015).

After that, the question generator 105 determines the type of perturbation by selecting one from among the found synonym, the antonym, and the modification rule (2016), and causes the processing to branch off based on the type of perturbation (2017). In other words, the type of perturbation is changed in Steps 1006 and 1012, and hence different perturbation is selected. In this case, when there are at least two options, the type of perturbation is selected by a random number. On the other hand, the perturbation is changed within the same group of perturbation in Steps 1008 and 1014, and hence the same perturbation is selected.

When the selected type of perturbation is the synonym, the question generator 105 selects the word at random from among the synonyms 406 of the synonym table 401, and sets the selected word as a variable X (2018). When the selected type of perturbation is the modification, the question generator 105 modifies the word of the candidate for the question in accordance with the rule 603 of the modification rules table 601, and sets the modified word as the variable X (2019). When the selected type of perturbation is the antonym, the question generator 105 selects the word at random from among the antonyms 506 of the antonym table 501, and sets the selected word as the variable X (2020).

After that, the question generator 105 outputs X as the word that has been perturbed (2021).

Next, a description is made of accompanying processings other than the estimation of the degree of achievement and the creation of the questions, which are performed in the learning support system 101 according to the first embodiment. The accompanying processings such as the processing (FIG. 14) for generating the word difficulty table and a processing (FIG. 15) for determining the degree of difficulty are performed by the processor 11 of the learning support system 101 executing a predetermined program, but may be executed by another computer.

Figure 14:
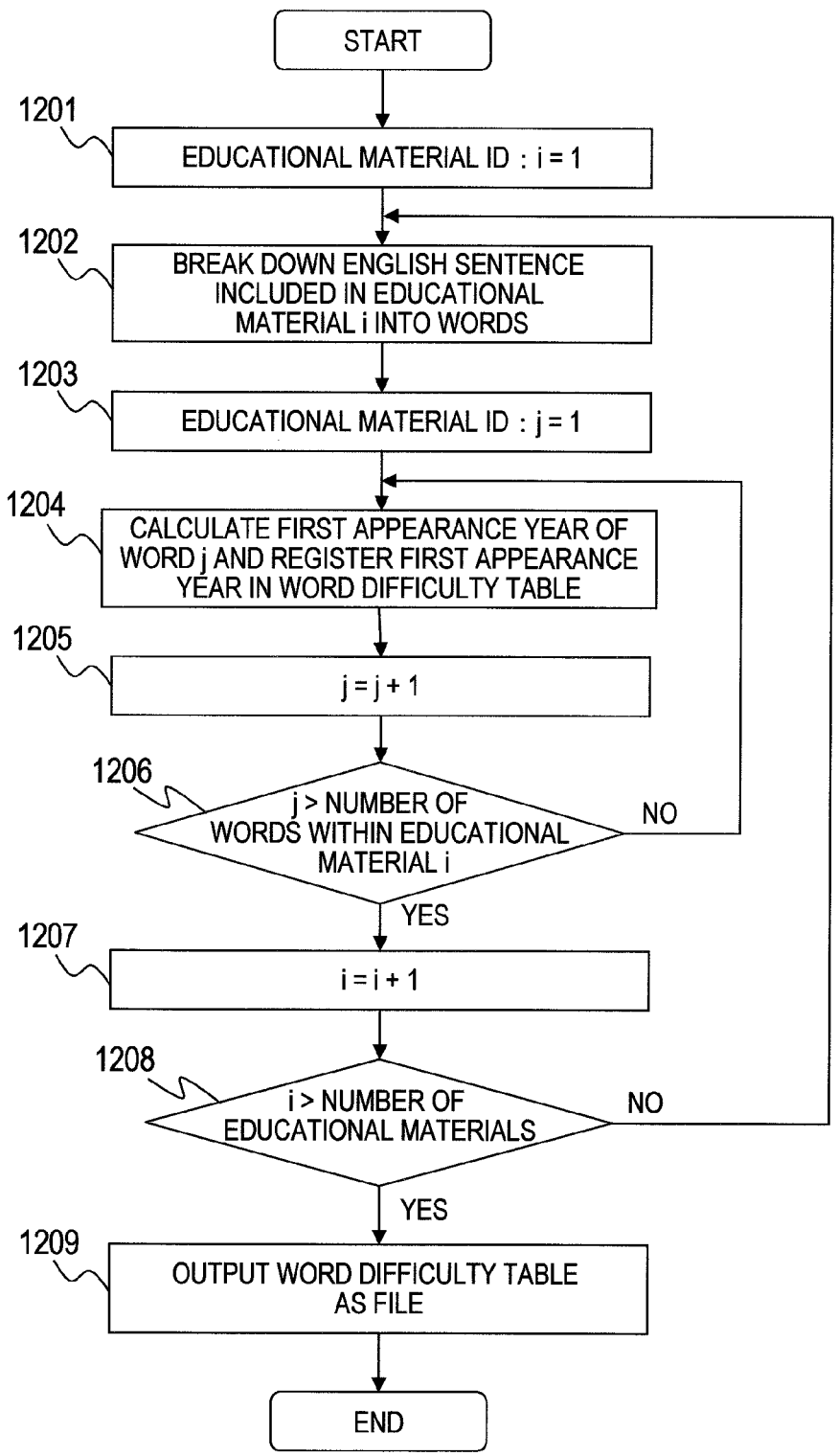
FIG. 14 is a flowchart of a processing for generating the word difficulty table according to the first embodiment.

FIG. 14 is a flowchart of the processing for generating the word difficulty table 301 according to the first embodiment.

First, the processor 11 initializes an educational material ID (i) to 1 (1201). After that, the processor 11 breaks down the English sentence included in an educational material i into words, and assigns an ID (j) to each of the broken-down words (1202).

Subsequently, the processor 11 initializes the word ID (j) to 1 (1203).

After that, the processor 11 calculates a first appearance year of a word j, and registers the first appearance year in the word difficulty table 301. In other words, when the degree of difficulty 204 of the transcription of the educational material i is smaller than the degree of difficulty 304 of the word j registered in the word difficulty table 301, the processor 11 registers the degree of difficulty 204 of the transcription of the educational material i in the word difficulty table 301 as the degree of difficulty 304 of the word j.

After that, in order to process the next word, the processor 11 adds 1 to j (1205), and determines whether or not j exceeds the number of words included in the educational material i (1206). As a result, when j is equal to or smaller than the number of words within the educational material i, the word left to be processed exists in the educational material i, and hence the processor 11 returns to Step 1204 to process the next word. On the other hand, when j is larger than the number of words within the educational material i, the processing of all the words included in the educational material i has been completed, and hence the processor 11 adds 1 to i in order to process the next educational material (1207).

After that, the processor 11 determines whether or not i exceeds the number of educational materials (1208). When i is equal to or smaller than the number of educational materials, the educational material left to be processed exists, and hence the processor 11 returns to Step 1202 to process the next educational material. On the other hand, when i exceeds the number of educational materials, the processing of all the educational materials has been completed, and hence the processor 11 outputs the word difficulty table 301 as a file and stores the file on the storage device 13.

Figure 15:
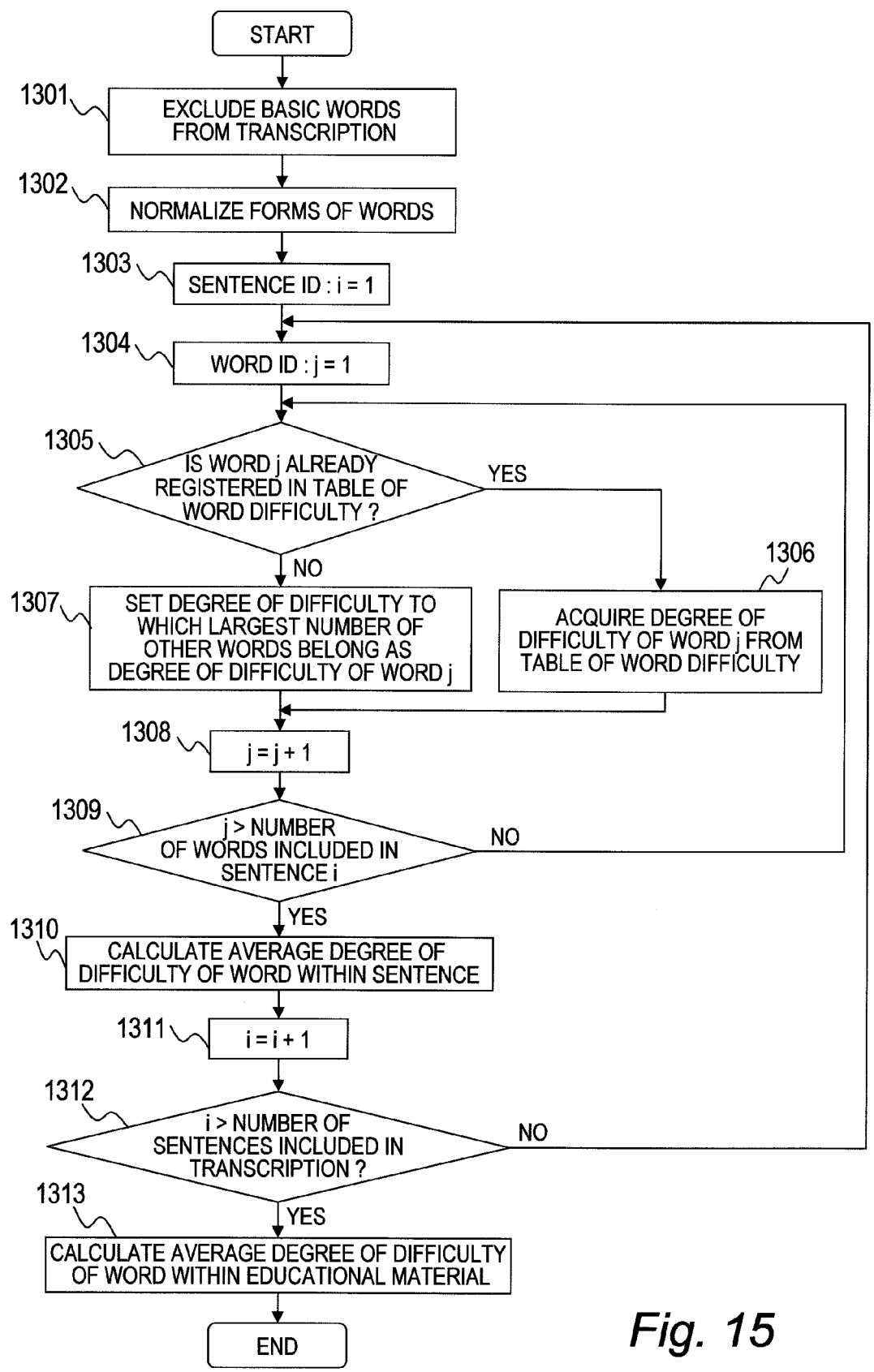
FIG. 15 is a flowchart of a processing for determining a degree of difficulty of a transcription within the educational material database according to the first embodiment.

FIG. 15 is a flowchart of the processing for determining the degree of difficulty 204 of the transcription within the educational material database 104 according to the first embodiment.

First, the processor 11 excludes basic words from within the transcription (1301). The basic words excluded here are, for example, words that frequently appear in English sentences, such as "a", "the", and "is".

After that, the processor 11 normalizes forms of words included in the transcription (1302). For example, the processor 11 converts the word in the plural form into the singular form and the word in the past tense form into the present tense form. Such a normalizing processing for the forms of words may employ a known method (method disclosed in, for example, Takenobu Tokunaga, "Information Retrieval and Language Processing", pp 23-26, University of Tokyo Press).

Subsequently, the processor 11 initializes a sentence ID (i) to 1 (1303), and initializes the word ID (j) to 1 (1304).

After that, the processor 11 determines whether or not the word j is already registered in the word difficulty table 301 (1305). In a case where the word j is registered in the word difficulty table 301, the processor 11 refers to the word difficulty table 301 to acquire the degree of difficulty 304 of the word j (1306).

On the other hand, In a case where the word j is not registered in the word difficulty table 301, the processor 11 acquires the degrees of difficulty of the words other than the word j within the same sentence from the word difficulty table 301, and estimates that the degree of difficulty to which the largest number of words belong is the degree of difficulty of the word j (1307).

Specifically, in a case where respective words included in a sentence i have degrees of difficulty being 2, 2, 5, 4, 2, and X and the word having the degree X of difficulty is not registered in the word difficulty table, the degree of difficulty being 2 appears most frequently among the degrees of difficulty of the words included in the sentence i, and hence the processor 11 estimates that the degree X of difficulty is 2.

After that, in order to process the next word, the processor 11 adds 1 to j (1308), and determines whether or not j is larger than the number of words included in the sentence i (1309). As a result, when j is equal to or smaller than the number of words within the sentence i, the word left to be processed exists in the sentence, and hence the processor 11 returns to Step 1305 to process the next word. On the other hand, when j is larger than the number of words within the sentence i, the processing of all the words included in the sentence i has been finished, and hence the processor 11 calculates an average of the degrees of difficulty of the words as the degree of difficulty of the sentence (1310).

After that, in order to process the next sentence, the processor 11 adds 1 to i (1311), and determines whether or not i is larger than the number of sentences included in the transcription (1312). When i is equal to or smaller than the number of sentences, the sentence left to be processed exists, and hence the processor 11 returns to Step 1304 to process the next sentence. On the other hand, when i is larger than the number of sentences, the processing of all the sentences included in the transcription has been finished, and hence the processor 11 calculates an average of the degrees of difficulty of the sentence as the degree of difficulty of the transcription (educational material) (1313).

For example, it is possible to calculate the degree of difficulty of the transcription by using the following equation. In the following equation, $\alpha$ and $\beta$ are calculated by using a regression equation so that the degree of difficulty becomes a school year for the learning which is assumed by a person who prepares the educational material.

$$(\text{degree of difficulty of the transcription}) = \alpha((\text{number of words})/(\text{number of sentences})) + \beta((\text{word difficulty})/(\text{number of words}))$$

(Modified Example of First Embodiment)

Next, a description is made of a modified example of the first embodiment. In this embodiment, liaison is used in place of the "perturbation". The liaison is a phenomenon in which, when at least two words are pronounced continuously under a certain condition, a sound that does not appear when the respective words are individually pronounced appears on the border between the word and the word. Conditions for causing the liaison are defined by rules described later, and the liaison does not always occur when a specific word is adjacent to another specific word. Therefore, even the learner 113 who has learned a question sentence including the liaison and a correct answer thereto by heart cannot always give a correct answer to another question based on the same liaison occurrence rule.

In this embodiment, to confirm whether or not correct knowledge regarding the liaison has been acquired, the learner 113 is caused to learn another question based on the same liaison rule. With this operation, it is expected that the comprehension of English sentences, in particular, the listening comprehension thereof improves.

Figure 20:
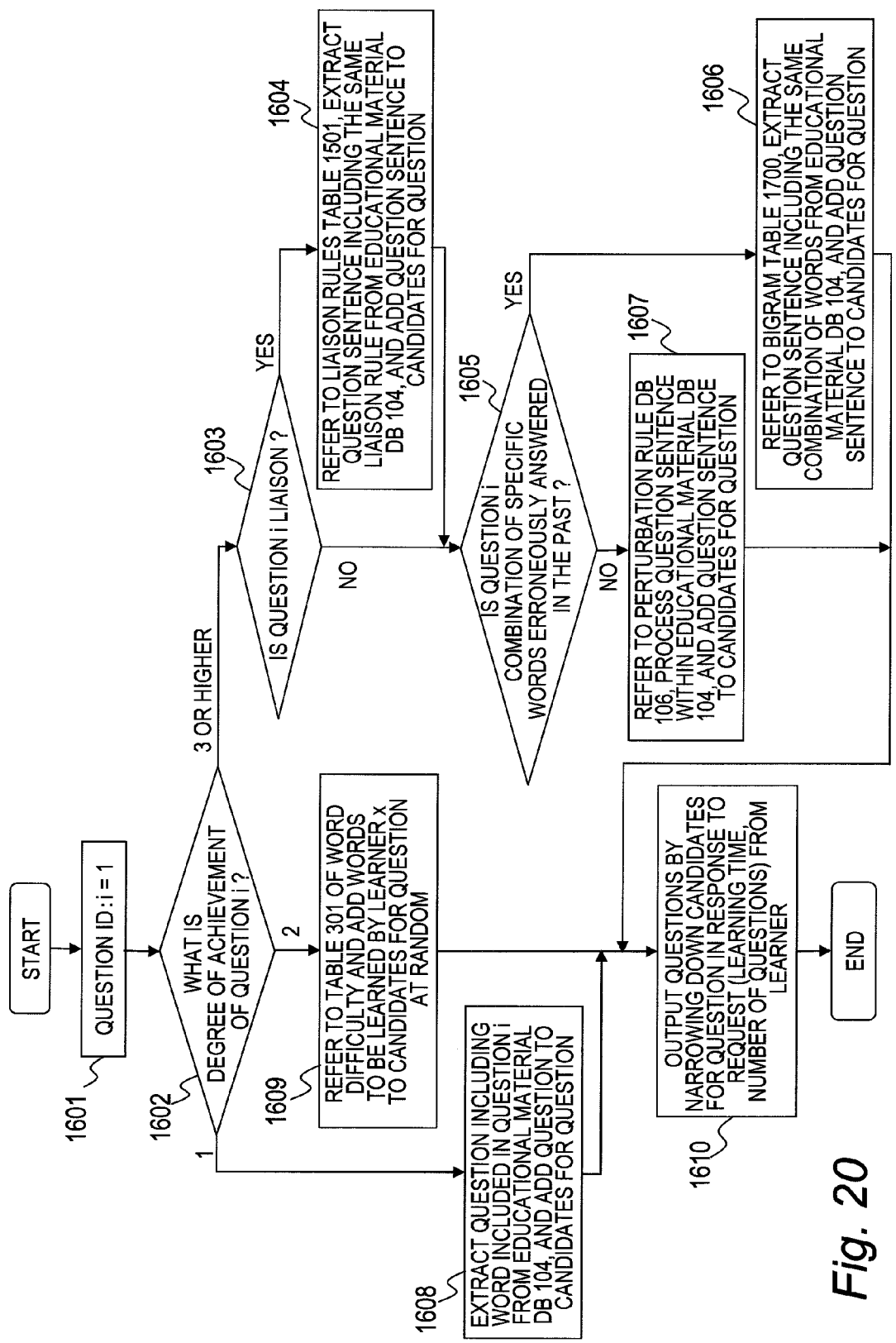
FIG. 20 is a flowchart of a question generation processing according to the modified example of the first embodiment.

The learning support system 101 according to this modified example includes a liaison rules table (FIG. 16) and a liaison syntax rules table (FIG. 17 and FIG. 18), and uses those tables to execute a question generation processing (FIG. 20).

FIG. 16 is a diagram illustrating a configuration of a liaison rules table 1501 according to the modified example of the first embodiment.

The liaison rules table 1501 is a table in which the rules regarding the liaison are defined. The liaison represents that the end of a consonant and the start of a vowel are pronounced in a blended manner at a link between words.

The liaison rules table 1501 is included in the question generator 105. It should be noted that the liaison rules table 1501 may be stored on the storage device 13 separately from the question generator 105 so as to be accessible to the question generator 105.

The liaison rules table 1501 includes the rule number 1502 and the rule 1503.

The rule number 1502 is a unique identifier for identifying a rule. The rule is a rule relating to how the liaison occurs when the question is created. FIG. 16 illustrates 13 rules as an example.

For example, rule 1 is a rule that defines that the liaison does not occur after a character string that ends with (.), (,), ('), ("), (!), or (?) because such a character string indicates a break between sentences or clauses.

Rule 2 is a rule that defines that the liaison occurs when a word includes ('s), ('ll), ('d), ('ve), ('t), ('re), or ('m) because such a word is a contracted form (or another type of form).

Rule 3 is a rule that defines that the liaison does not occur after a numeral.

Rule 4 is a rule that defines that the liaison occurs when the previous word ends with a consonant and when the word concerned starts with a vowel because the consonant is pronounced in combination with the vowel.

Rule 5 is a rule that defines that the liaison occurs when the previous word ends with a consonant+(e) because (e) is not pronounced.

Rule 6 is a rule that defines that the liaison occurs when (t) or (d) is sandwiched between two consonants because the (t) or (d) is not pronounced.

Rule 7 is a rule that defines that the liaison occurs when the previous word ends with (s), (z), (se), (ze), or (ce) and when the word concerned starts with (s) or (z) because the "s-" sound is pronounced longer than usual.

Rule 8 is a rule that defines that the liaison occurs when the previous word ends with a consonant and when the word concerned starts with the same consonant because the consonant is pronounced longer than usual.

Rule 9 is a rule that defines that the liaison occurs when the previous word ends with a vowel and when the word concerned starts with a vowel because the "j-" sound or the "w-" sound is added between the vowels.

Rule 10 is a rule that defines that the liaison occurs when the previous word ends with (s), (z), or (ce) and when the word concerned starts with (y) or (w) because the "s-" sound and the "y-" sound become the "sh-" sound, and because the "s-" sound and the "w-" sound become the "sw-" sound.

Rule 11 is a rule that defines that the liaison occurs if the previous word ends with (w) and if the word concerned starts with a vowel because the "w-" sound is added to the vowel.

Rule 12 is a rule that defines that the liaison occurs if the previous word ends with (d) or (to) and if the word concerned starts with (d), (t), (b), or (p) because a glottal closure (allophone) occurs in (d) or (to).

Rule 13 is a rule that defines that the liaison occurs if the previous word ends with (d) or (to) and if the word concerned starts with (y) because the two characters are integrated to generate the "j-" sound and the "ch-" sound.

Figure 17:
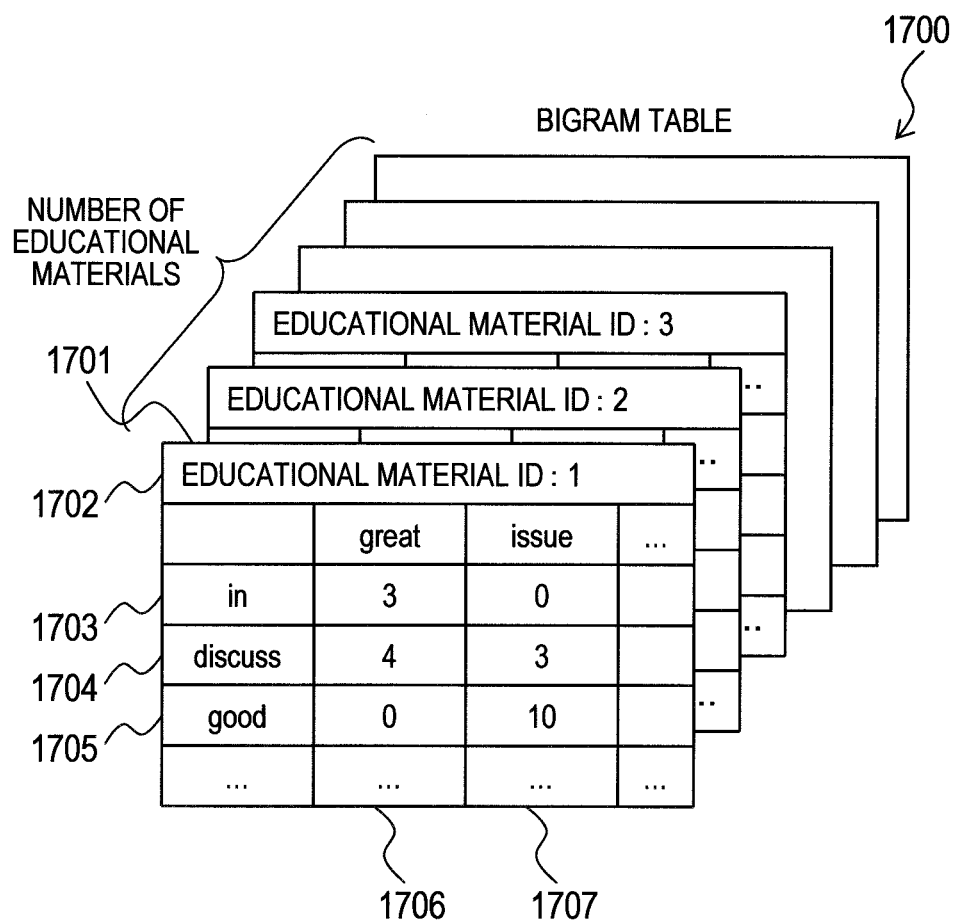
FIG. 17 is a diagram illustrating a configuration of a liaison syntax rules table (bigram table) according to the modified example of the first embodiment.

FIG. 17 is a diagram illustrating a configuration of the liaison syntax rules table (bigram table 1700) according to the modified example of the first embodiment.

The bigram table 1700 includes a table corresponding to each educational material ID. The table for each educational material ID (for example, table 1701 whose educational material ID is 1) includes an educational material ID 1702, words 1703 to 1705 that constitute rows, and words 1706 and 1707 that constitute columns.

The bigram table 1700 shows the number of combinations in which the word constituting the row is followed by the word constituting the column. For example, the bigram table 1700 means that the educational material whose ID is 1 includes three combinations in which "in" is followed by "great" and four combinations in which "discuss" is followed by "great".

Through use of the bigram table 1700, in the question generation processing (FIG. 20), it is possible to identify the educational material including the same combination of words (in other words, the same liaison configuration).

Figure 18:
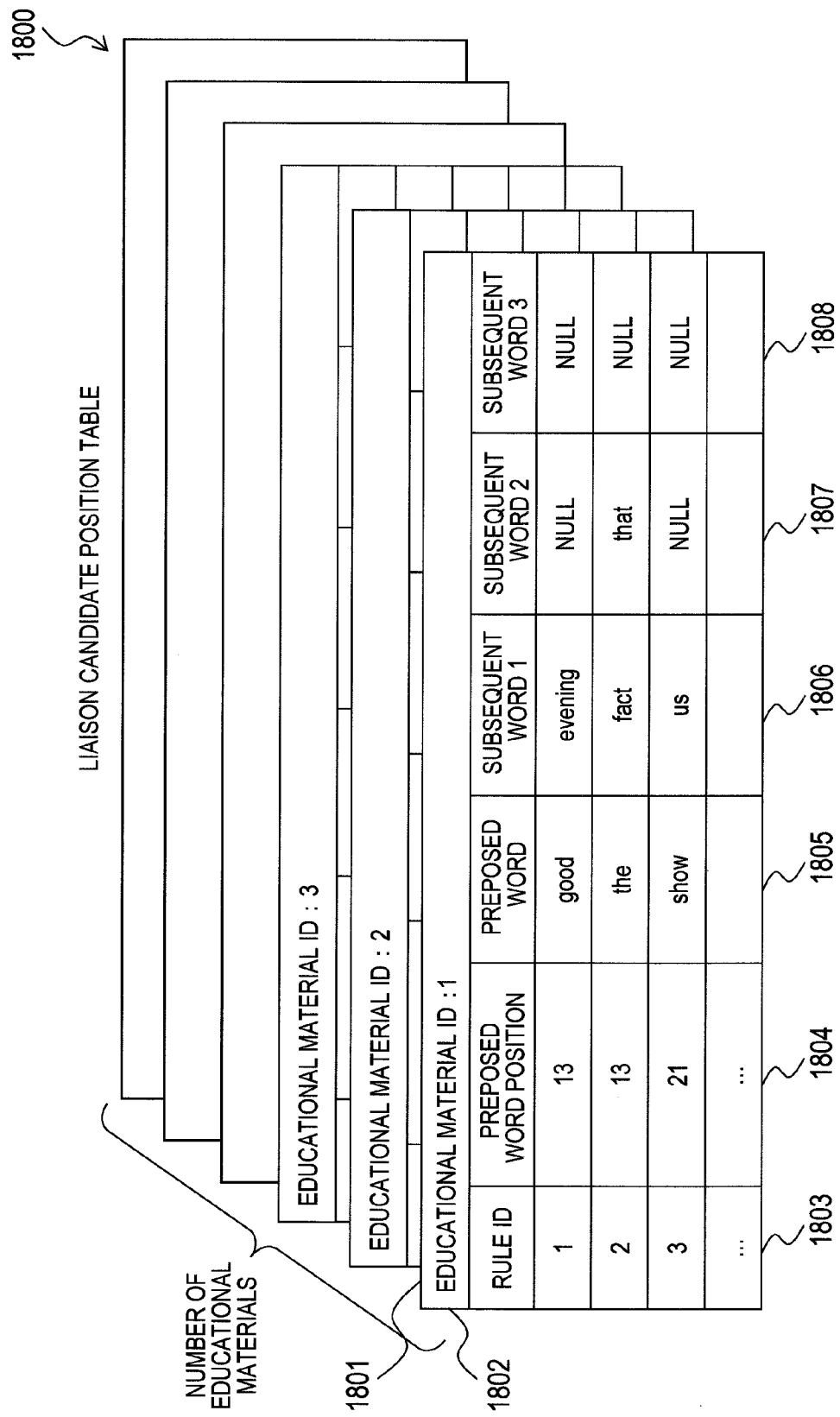
FIG. 18 is a diagram illustrating a configuration of a liaison syntax rules table (liaison candidate position table) according to the modified example of the first embodiment.

FIG. 18 is a diagram illustrating a configuration of the liaison syntax rules table (liaison candidate position table 1800) according to the modified example of the first embodiment.

The liaison candidate position table 1800 includes a table corresponding to each educational material ID. The table for each educational material ID (for example, table 1801 whose educational material ID is 1) includes an educational material ID 1802, a rule ID 1803, a preposed word position 1804, a preposed word 1805, a subsequent word 1 (1806), a subsequent word 2 (1807), and a subsequent word 3 (1808).

The rule ID 1803 is a unique identifier for identifying the rule. The preposed word position 1804 indicates a position of the preposed word 1805 within the educational material (transcription) (in other words, position of the word from the start). The preposed word 1805 is a word followed by the subsequent words 1806 to 1808. The subsequent words 1 to 3 (1806 to 1808) are words that follow the preposed word 1805. Specifically, the subsequent word 1 (1806) is a word that appears immediately after the preposed word 1805, the subsequent word 2 (1807) is a word that appears immediately after the subsequent word 1 (1806), and the subsequent word 3 (1808) is a word that appears immediately after the subsequent word 2 (1807). The number of fields of the subsequent words is three in the liaison syntax rules table illustrated in the figure, but may be larger or smaller than three.

It should be noted that NULL is registered in a case where there is no subsequent word or the liaison does not occur with respect to the subsequent word.

Figure 19:
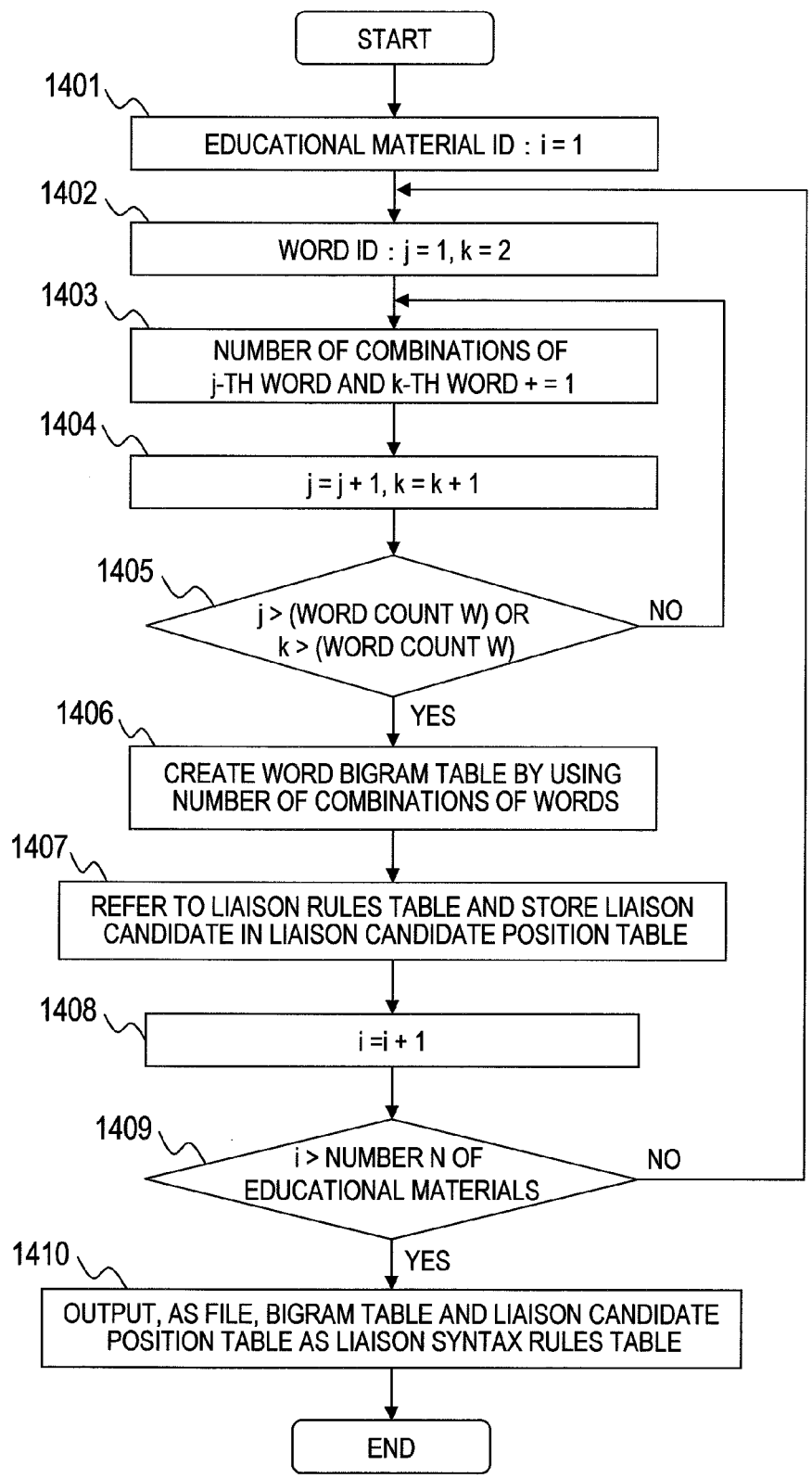
FIG. 19 is a flowchart of a processing for generating the liaison syntax rules table according to the modified example of the first embodiment.

FIG. 19 is a flowchart of the processing for generating the liaison syntax rules table according to the modified example of the first embodiment.

First, the processor 11 sets the educational material ID (i) to 1 being the initial value (1401), and sets the word IDs (j and k) to (1 and 2) being the initial values (1402). Through this setting, the first word and the adjacent second word are compared with each other.

After that, the processor 11 adds 1 to the number of combinations of the j-th word and the k-th word, which is stored in the memory 12 (1403). Then, in order to process the next combination of words, the processor 11 adds 1 respectively to j and k (1404).

Then, the processor 11 compares the word IDs (j and k) with a word count W included in the educational material i (1405), and when both the word IDs (j and k) are equal to or smaller than the word count W, returns to Step 1403 in order to process the next combination of words. On the other hand, when any one of the word IDs (j and k) exceeds the word count W, the processing for all the combinations of words has been finished, and hence the processor 11 creates the bigram table 1700 by using the summed-up number of combinations (1406).

After that, the processor 11 refers to the liaison rules table 1501 and stores a liaison candidate in the liaison candidate position table 1800 (1407). In other words, the processor 11 determines whether or not the combination of the j-th word and the k-th word meets any one of the rules 1503 within the liaison rules table 1501, and when the rule 1503 defining that the liaison occurs is met, registers j as the preposed word position 1804 of the liaison candidate position table 1800, the j-th word as the preposed word 1805, and the i-th word as the subsequent word 1 (1806).

Further, when the word following the i-th word is the subsequent word, the (i+1)th word is registered as the subsequent word 2 (1807), and the (i+2)th word is registered as the subsequent word 3 (1808). It should be noted that as described above, the subsequent word is a word that causes the liaison with respect to the preposed word or causes the liaison with respect to the subsequent word.

After that, in order to process the next educational material, the processor 11 adds 1 to i (1408), and determines whether or not i is larger than a number N of educational materials (1409). As a result, when i is equal to or smaller than the number N of educational materials, the educational material left to be processed exists, and hence the processor 11 returns to Step 1402 to process the next word. On the other hand, when i is larger than the number N of educational materials, the processing of all the educational materials has been completed, and hence the processor 11 outputs, as a file, the liaison syntax rules table including the bigram table 1700 and the liaison candidate position table 1800, and stores the liaison syntax rules table on the storage device 13.

FIG. 20 is a flowchart of the question generation processing executed by the question generator 105 and the question presentation module 112 according to the modified example of the first embodiment, which is executed in place of the above-mentioned question generation processing (FIG. 12A and FIG. 12B).

First, the question generator 105 sets a question ID (i) to 1 being the initial value (1601). After that, the question generator 105 causes the processing to branch off depending on the degree of achievement of a question i (1602).

When the degree of achievement of the question i is 1, the question generator 105 extracts the question including the word included in the question i from the educational material database 104, adds the question to the candidates for the question (1608), and advances to Step 1610.

When the degree of achievement of the question i is 2, the question generator 105 refers to the word difficulty table 301, adds the words to be learned by a learner x to the candidates for the question at random (1609), and advances to Step 1610.

In Step 1610, the question presentation module 112 outputs questions by narrowing down the candidates for question in response to the request from the learner. The request from the learner relates to, for example, the learning time or the number of questions.

On the other hand, when the degree of achievement of the question i is 3 or higher, the question generator 105 refers to the liaison rules table 1501 to determine whether or not the question i is the liaison (1603).

When the question i is the liaison, the question generator 105 refers to the liaison rules table 1501, extracts a question sentence including the same liaison rule from the educational material database 104, and adds the question sentence to the candidates for the question (1604). After that, the question generator 105 determines whether or not the question i is a combination of specific words erroneously answered in the past (1605).

As a result, when the question i is a combination of specific words erroneously answered in the past, the question generator 105 refers to the liaison syntax rules table (bigram table) 1700, extracts a question sentence including the same combination of words from the educational material database 104, adds the question sentence to the candidates for the question (1606), and advances to Step 1610.

On the other hand, when the question i is not a combination of specific words erroneously answered in the past, the question generator 105 refers to the perturbation rule database 106, modifies the question sentence within the educational material database 104 and adds the modified question sentence to the candidates for the question (1607), and advances to Step 1610.

As described above, according to the first embodiment of this invention, based on the correct/wrong, the delay time of the answer, the type of perturbation group, the consecutive correct answer count, and the consecutive wrong answer count which relate to the question, the weak point of the learner is found, the degree of achievement is determined, and the question appropriate to the degree of achievement is asked, which can improve learning efficiency.

Further, the modification using the perturbation is used to thereby cancel an influence of memory relating to the question and the correct answer, and hence it is possible to ask questions exhibiting high learning efficiency.

Further, through the modification using the liaison, it is possible to ask questions exhibiting high learning efficiency regarding the liaison.

(Second Embodiment)

Next, a description is made of a second embodiment of this invention.

The second embodiment is different from the above-mentioned first embodiment in that a presentation module 1102 for the degree of difficulty of the educational material for learning is provided, and is the same in the other points. Therefore, the same components and processings are denoted by the same reference symbols, and descriptions thereof are omitted.

Figure 21:
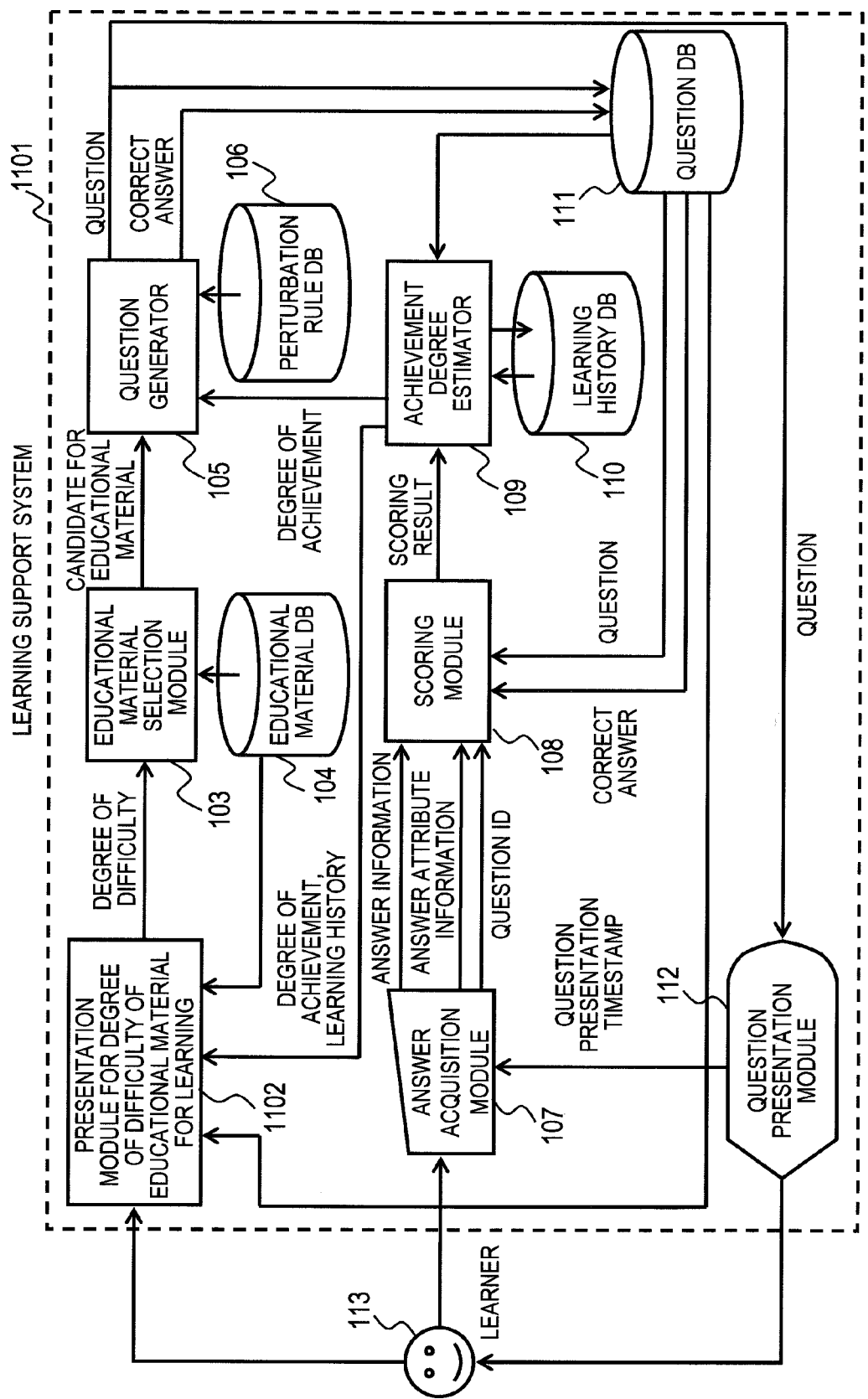
FIG. 21 is a functional block diagram illustrating a configuration of a learning support system according to a second embodiment.

FIG. 21 is a functional block diagram illustrating a configuration of an learning support system 1101 according to the second embodiment.

The learning support system 101 according to the first embodiment includes the presentation module 1102 for the degree of difficulty of the educational material for learning, the educational material selection module 103, the question generator 105, the answer acquisition module 107, the scoring module 108, the achievement degree estimator 109, and the question presentation module 112. Each of those modules is implemented by the processor 11 executing a predetermined program.

The storage device 13 stores the educational material database 104 as illustrated in FIG. 3, the perturbation rule database 106 as illustrated in FIG. 5, FIG. 6, and FIG. 7, the learning history database 110 as illustrated in FIG. 9, and the question database 111 as illustrated in FIG. 8.

The presentation module 1102 for the degree of difficulty of the educational material for learning refers to the educational material database 104 and the question database 111 based on the degree of achievement and a learning history acquired from the achievement degree estimator 109, and determines the degree of difficulty appropriate to the learner. The degree of difficulty determined by the presentation module 1102 for the degree of difficulty of the educational material for learning is input to the educational material selection module 103.

The determination of the degree of difficulty which is performed by the presentation module 1102 for the degree of difficulty of the educational material for learning can employ, for example, the same method as the processing for calculating the degree of difficulty which is described referring to FIG. 15. Further, in the same manner as in the first embodiment, the degree of difficulty of the question to be asked may be estimated based on the age and the school year input by the learner 113.

As described above, according to the second embodiment of this invention, in addition to the effects of the abovementioned first embodiment, the degree of difficulty appropriate to the learner is determined based on the degree of achievement and the learning history, and hence it is possible to cut the time and labor for inputting the degree of difficulty and ask the questions exhibiting higher learning efficiency.

The embodiments of this invention have been described above with reference to the case of handling the questions about English, but the learning support system according to the embodiments of this invention can be applied to any other language that enables generation of another question by changing the word to be the question in accordance with the perturbation.

While the present invention has been described in detail and pictorially in the accompanying drawings, the present invention is not limited to such detail but covers various obvious modifications and equivalent arrangements, which fall within the purview of the appended claims.

What is claimed is:

1. A learning support system which includes a computer including a processor and a memory, comprising:
    a question database in which a question to be asked of an answerer is stored;
    a learning history database in which a result of giving an answer to the question asked of the answerer, is recorded;
    a question generator for generating a question relating to a word changed in accordance with perturbation that changes a word, and stores the question in the question database;
    a question presentation module for asking the answerer the question extracted from the question database;
    an answer acquisition module for receiving the answer to the asked question;
    a scoring module for determining correctness or wrongness of the answer, by referring to the question database; and
    an achievement degree estimator for storing a result of the determination in the learning history database, wherein:
    the achievement degree estimator compares a number of types of perturbation within the questions to which a correct answer has been given with a predetermined learning threshold value; and
    the question generator generates a word changed in accordance with the perturbation of a different type in a case where the number of types of perturbation within the questions to which the correct answer has been given is smaller than the predetermined learning threshold value, and sets a question relating to the generated word as a candidate for the question.

2. The learning support system according to claim 1, wherein the achievement degree estimator is configured to, in order to calculate the number of types of perturbation within the questions to which the correct answer has been given:
    refer to the question database to acquire questions that are generated in accordance with the perturbation based on the same question;
    acquire the types of perturbation of the acquired questions from the question database; and
    sum up the acquired types of perturbation of the questions.

3. The learning support system according to claim 1, further comprising a perturbation rule database that includes at least any two of the types of perturbation being a synonym, an antonym, and a modification rule,
    wherein the question generator is configured to, in order to set the question relating to the word changed in accordance with the perturbation of the different type as the candidate for the question:
    select the word to be the question from the perturbation rule database;
    select modification of the selected word from the perturbation rule database by a random number; and
    generate the question relating to the word subjected to the selected modification.

4. The learning support system according to claim 1, wherein:
    the achievement degree estimator is configured to:
    refer to the learning history database, and compare a consecutive correct answer count with a predetermined consecutive-correct-answer threshold value; and
    perform a processing for comparing the number of types of perturbation within the questions to which the correct answer has been given with the predetermined learning threshold value in a case where the consecutive correct answer count is larger than the predetermined consecutive-correct-answer threshold value; and
    the question generator sets, when the consecutive correct answer count is equal to or smaller than the predetermined consecutive-correct-answer threshold value, the question relating to the word, which is of the same type of perturbation as the question to which the correct answer has been given and has different perturbation, as the candidate for the question.

5. The learning support system according to claim 4, wherein:
    the answer acquisition module measures a delay time of the answer, which passes after the question is presented to the answerer, until inputting of the answer is completed;
    the achievement degree estimator is configured to:
    refer to the learning history database to determine whether the question to which the answer has been input is correctly answered;
    perform a processing for comparing the consecutive correct answer count with the predetermined consecutive-correct-answer threshold value in a case where the question is correctly answered; and
    refer to the learning history database and compare the delay time of the answer to the question with a predetermined delay-time threshold value in a case where the question is incorrectly answered; and
    the question generator sets a question whose speaking speed is slow and which includes the word of the correct answer to the question, as the candidate for the question, in a case where the delay time of the answer is larger than the predetermined delay-time threshold value.

6. The learning support system according to claim 5, wherein:
    the achievement degree estimator compares the number of types of perturbation within the questions to which the correct answer has been given with a predetermined number-of-types threshold value, in a case where the delay time of the answer is equal to or smaller than the predetermined delay-time threshold value; and the question generator generates the word changed in accordance with the perturbation of the different type, in a case where the number of types of perturbation within the questions to which the correct answer has been given is larger than the predetermined number-of-types threshold value, and sets the question relating to the generated word as the candidate for the question.

7. The learning support system according to claim 6, wherein:

the achievement degree estimator refers to the learning history database and compares a consecutive wrong answer count with a predetermined consecutive-wrong-answer threshold value in a case where the number of types of perturbation within the questions to which the correct answer has been given is smaller than the predetermined number-of-types threshold value; and the question generator is configured to:

set which is of the same type of perturbation as the question to which the correct answer has been given and has different perturbation, as the candidate for the question in a case where the consecutive wrong answer count is larger than the predetermined consecutive-wrong-answer threshold value, the question relating to the word; and set the same question as the question to which the answer has been input, as the candidate for the question in a case where the consecutive wrong answer count is smaller than the predetermined consecutive-wrong-answer threshold value.

8. A learning support method to be performed by a learning support system, the learning support system which includes a computer including a processor and a memory including:

a question database in which a question to be asked of an answerer is stored; and a learning history database in which a result of giving an answer to the question asked of the answerer, is recorded, the learning support method including:

a question generating operation of generating a question relating to a word changed in accordance with perturbation that changes a word, and storing the question in the question database;

a question presentation operation of asking the answerer the question extracted from the question database;

an answer acquisition operation of receiving the answer to the asked question;

a scoring operation of determining correctness or wrongness of the answer by referring to the question database; and an achievement degree estimating operation of storing a result of the determination, in the learning history database, wherein:

the achievement degree estimating operation includes an operation of comparing a number of types of perturbation within the questions to which a correct answer has been given, with a predetermined learning threshold value; and the question generating operation includes operations of generating a word changed in accordance with the perturbation of a different type, in a case where the number of types of perturbation within the questions to which the correct answer has been given is smaller than the predetermined learning threshold value, and setting a question relating to the generated word as a candidate for the question.

9. The learning support method according to claim 8, wherein the achievement degree estimating operation includes an operation of calculating the number of types of perturbation within the questions to which the correct answer has been given, by:

referring to the question database to acquire questions that are generated in accordance with the perturbation based on the same question;

acquiring the types of perturbation of the acquired questions from the question database; and summing up the acquired types of perturbation of the questions.

10. The learning support method according to claim 8, wherein:

the learning support system further includes a perturbation rule database that includes at least any two of the types of perturbation being a synonym, an antonym, and a modification rule; and the question generating operation includes an operation of setting the question relating to the word changed according to the perturbation of the different type, as the candidate for the question, by:

selecting the word to be the question from the perturbation rule database;

selecting modification of the selected word from the perturbation rule database, by a random number; and generating the question relating to the word subjected to the selected modification.

11. The learning support method according to claim 8, wherein:

wherein the achievement degree estimating operation includes:

referring to the learning history database, and comparing a consecutive correct answer count with a predetermined consecutive-correct-answer threshold value; and performing a processing for comparing the number of types of perturbation within the questions to which the correct answer has been given with the predetermined learning threshold value, in a case where the consecutive correct answer count is larger than the predetermined consecutive-correct-answer threshold value; and the question generating operation includes an operation of setting the question relating to the word, which is of the same type of perturbation as the question to which the correct answer has been given and has different perturbation, as the candidate for the question, in a case where the consecutive correct answer count is equal to or smaller than the predetermined consecutive-correct-answer threshold value.

12. The learning support method according to claim 11, wherein:

the answer acquisition operation includes an operation of measuring a delay time of the answer, which passes after the question is presented to the answerer, until inputting of the answer is completed;

the achievement degree estimating operation includes operations of:

referring to the learning history database to determine whether the question to which the answer has been input, is correctly answered;

performing a processing for comparing the consecutive correct answer count with the predetermined consecutive-correct-answer threshold value, in a case where the question is correctly answered; and referring to the learning history database and comparing the delay time of the answer to the question with a predetermined delay-time threshold value, in a case where the question is incorrectly answered; and the question generating operation includes operations of setting a question whose speaking speed is slow and which includes the word of the correct answer to the question, as the candidate for the question, in a case where the delay time of the answer is larger than the predetermined delay-time threshold value.

13. The learning support method according to claim 12, wherein:

the achievement degree estimating operation includes an operation of comparing the number of types of perturbation within the questions to which the correct answer has been given, with a predetermined number-of-types threshold value, in a case where the delay time of the answer is equal to or smaller than the predetermined delay-time threshold value; and the question generating operation includes an operation of generating the word changed in accordance with the perturbation of the different type, and setting the question relating to the generated word as the candidate for the question, in a case where the number of types of perturbation within the questions to which the correct answer has been given is larger than the predetermined number of types threshold value.

14. The learning support method according to claim 13, wherein:

the achievement degree estimating operation includes an operation of referring to the learning history database and comparing a consecutive wrong answer count with a predetermined consecutive-wrong-answer threshold value, in a case where the number of types of perturbation within the questions to which the correct answer has been given is smaller than the predetermined number-of-types threshold value; and the question generating operation includes operations of:

setting the question relating to the word, which is of the same type of perturbation as the question to which the correct answer has been given and has different perturbation, as the candidate for the question, in a case where the consecutive wrong answer count is larger than the predetermined consecutive-wrong-answer threshold value; and setting the same question as the question to which the answer has been input, as the candidate for the question, in a case where the consecutive wrong answer count is smaller than the predetermined consecutive-wrong-answer threshold value.

\* \* \* \* \*